United States Patent
Haack et al.

(12)

(10) Patent No.: US 8,074,928 B2
(45) Date of Patent: Dec. 13, 2011

(54) FLOOR SYSTEM FOR A FUSELAGE AIRFRAME OF AN AIRCRAFT

(75) Inventors: Cord Haack, Beckdorf (DE); Markus Schumacher, Buxtehude (DE); Andrew Muin, Harsefeld (DE); Ian Scoley, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/842,769

(22) Filed: Jul. 23, 2010

(65) Prior Publication Data

US 2011/0011978 A1    Jan. 20, 2011

Related U.S. Application Data

(63) Continuation of application No. PCT/EP2009/050128, filed on Jan. 7, 2009.

(60) Provisional application No. 61/063,896, filed on Feb. 7, 2008.

(30) Foreign Application Priority Data

Feb. 7, 2008  (DE) .......................... 10 2008 007 838

(51) Int. Cl.
*B64C 1/18*    (2006.01)
(52) U.S. Cl. ..................................... 244/119; 244/118.5
(58) Field of Classification Search .............. 244/117 R, 244/118.1, 118.2, 118.5, 129.1, 119
See application file for complete search history.

(56) References Cited

U.S. PATENT DOCUMENTS

| 2,412,778 | A | * | 12/1946 | Kosek | 244/120 |
| 4,479,621 | A | | 10/1984 | Bergholz | |
| 4,989,809 | A | * | 2/1991 | Arnold | 244/137.1 |
| 5,086,996 | A | * | 2/1992 | Roeder et al. | 244/119 |
| 5,752,673 | A | * | 5/1998 | Schliwa et al. | 244/118.6 |
| 6,517,028 | B2 | * | 2/2003 | Huber | 244/137.1 |
| 6,659,402 | B1 | | 12/2003 | Prochaska | |

(Continued)

FOREIGN PATENT DOCUMENTS

DE            3 141 869            5/1983

(Continued)

OTHER PUBLICATIONS

German Office Action for DE 10 2008 007838.7 dated May 3, 2010.

(Continued)

*Primary Examiner* — Benjamin P Lee
(74) *Attorney, Agent, or Firm* — Jenkins, Wilson, Taylor & Hunt, P.A.

(57) ABSTRACT

A floor system for a fuselage section of an aircraft is provided. The floor system has an essentially self-supporting design and is substantially mechanically separate from the fuselage section as primary structure. Consequent to the free or self-supporting design of the floor system in the fuselage cell, the layout of the floor system along an aircraft axis can be matched to customer specifications in a simple manner without reference to structural boundary conditions of the fuselage structure. A floor surface for the floor system is formed from a number of floor elements which can be fitted with functional elements, wherein filling of empty spaces or cavities can be achieved with a number of floor equalization elements. As the floor elements have a relatively large support or fixing surface the loads induced by the functional elements are introduced into the floor system distributed over a large area such that the structural components thereof can be of a structurally lighter and thus weight-saving size.

12 Claims, 17 Drawing Sheets

U.S. PATENT DOCUMENTS

| | | | |
|---|---|---|---|
| 7,073,994 B2 | 7/2006 | Huber et al. | |
| 7,338,013 B2 * | 3/2008 | Vetillard et al. | 244/117 R |
| 7,475,850 B2 * | 1/2009 | Vetillard et al. | 244/117 R |
| 7,775,478 B2 * | 8/2010 | Wood et al. | 244/119 |
| 2004/0245391 A1 * | 12/2004 | Kunzel et al. | 244/119 |
| 2006/0006284 A1 * | 1/2006 | Vetillard et al. | 244/119 |
| 2006/0226288 A1 * | 10/2006 | Vetillard et al. | 244/119 |
| 2007/0176048 A1 * | 8/2007 | Huber et al. | 244/119 |
| 2008/0078129 A1 | 4/2008 | Wood et al. | |
| 2008/0093503 A1 * | 4/2008 | Cacciaguerra | 244/119 |
| 2008/0105785 A1 * | 5/2008 | Griess et al. | 244/120 |
| 2008/0217478 A1 * | 9/2008 | Keeler et al. | 244/119 |
| 2009/0236472 A1 * | 9/2009 | Wood | 244/119 |
| 2009/0277995 A1 * | 11/2009 | Bergmann et al. | 244/119 |
| 2009/0321569 A1 * | 12/2009 | Schroeer et al. | 244/119 |
| 2010/0001134 A1 * | 1/2010 | Braeutigam et al. | 244/119 |
| 2010/0044510 A1 | 2/2010 | Schroeer et al. | |
| 2010/0126101 A1 * | 5/2010 | Wood et al. | 52/650.3 |
| 2010/0213315 A1 * | 8/2010 | Marpinard | 244/119 |
| 2010/0230535 A1 * | 9/2010 | Huber et al. | 244/118.1 |
| 2010/0243803 A1 * | 9/2010 | Westre et al. | 244/119 |

FOREIGN PATENT DOCUMENTS

| | | |
|---|---|---|
| DE | 10145276 A1 * | 7/2003 |
| DE | 10019123 A1 * | 10/2007 |
| DE | 102006019123 | 10/2007 |
| EP | 1473 222 A1 | 11/2004 |
| WO | WO 2007/033640 | 3/2007 |
| WO | WO 2007/141291 | 12/2007 |

OTHER PUBLICATIONS

International Search Report for PCT/EP2009/050128 dated Oct. 22, 2009.

* cited by examiner

(12)  United States Patent

FLOOR SYSTEM FOR A FUSELAGE AIRFRAME OF AN AIRCRAFT

CROSS-REFERENCE TO RELATED APPLICATIONS

This application is a continuation of PCT/EP 2009/050128 filed Jan. 7, 2009 and claims the benefit of U.S. Provisional Application No. 61/063,896, filed Feb. 7, 2008 and German Patent Application No. 10 2008 007 838.7, filed Feb. 7, 2008, the entire disclosures of which are herein incorporated by reference.

FIELD OF THE INVENTION

The invention relates to a complex floor system for a fuselage airframe of an aircraft comprising a large number of floor members to form a floor surface.

For reasons of comfort and due to use at high altitudes, to optimise use present-day passenger aircraft generally have compression-proof fuselage airframes, the internal pressure of which, at a flight altitude of, for example 12,000 m corresponds to an air pressure which prevails at approximately 1,800 m. The fuselage airframe of an aircraft is formed using a plurality of substantially barrel-shaped fuselage sections which are arranged in tandem and are connected by transverse butt straps. Each fuselage section is formed by a plurality of annular formers which are arranged in tandem and are covered on the outside with a fuselage cell skin. Running between the annular formers in the direction of a longitudinal axis of the aircraft are longitudinal reinforcing members, in particular stringers, which are attached to the inside of the fuselage cell skin over the periphery of the fuselage section preferably in a uniform spacing parallel to one another. The former spacing of a fuselage airframe is between 50 cm and 100 cm, depending on the type of aircraft and the structural loads. The stringers, the annular formers, the fuselage cell skin, the transverse butt straps as well as further components of the fuselage cell structure are generally formed using an aluminium alloy material. Alternatively, individual components ("hybrid construction method") or all components can be produced using fibre-reinforced plastics materials, for example carbon fibre-reinforced epoxy resins.

A floor of the passenger cabin is formed, inter alia, by a plurality of crossbars which are usually connected on either side to a respective annular former. The crossbars are usually supported downwards on either side by so-called Samer rods or other vertical struts, one end of which is connected to the end of a crossbar and the other end to an annular former. Attached to the crossbars is a plurality of longitudinal profiled parts which can be configured as seat rail profiled parts for receiving the seating. Floor plates are inserted and attached between the seat rail profiled parts to obtain a continuous, walkable and planar floor. The floor plates are usually formed using sandwich plates which are produced using fibre-reinforced plastics materials. The floor divides the fuselage airframe of the aircraft horizontally into the passenger compartment or, more specifically, the passenger cabin and the hold located below. In most cases, the interior layout of a fuselage airframe of an aircraft will not be changed for the entire service life, which can be as long as 30 years. However, an exception is the refitting of passenger aircraft into freight aircraft, which is a widespread practice and which, from the point of view of refit expense, is, however, almost comparable with a new construction.

In aircraft accident situations, the seat rail profiled parts must be able to withstand mechanical forces in extreme cases ranging up to 20 g in the flight direction, so that the seat rail profiled parts have to be configured such that they are statically solid and consequently correspondingly heavy, which severely affects the payload of the aircraft.

Furthermore, inter alia, the arrangement of passenger seats on conventional floor systems becomes inflexible thereby making it difficult to adapt the seating arrangement to customer-specific requirements. For example, the refitting of an existing seating arrangement of 2×3 rows of seats with one aisle into a seating arrangement of 3×2 rows of seats and two aisles requires a considerable refit expense, because the entire frame of the floor has to be modified. Alternatively, it would be possible to provide additional seat rail profiled parts to cover layout variations of this type, but this would increase the weight. Existing passenger seats which usually have four leg supports, at the ends of which the attachment points for the seat rail profiled parts are connected, cannot be secured to the seat rail profiled parts in random positions along the longitudinal axis of the aircraft due to the loads which are produced in an accident situation.

SUMMARY OF THE INVENTION

The object of the invention is to avoid the disadvantages described above of the known embodiments of floor systems in respect of layout variants in the passenger cabin.

This object is achieved by a floor system which has the features of claim 1.

Due to the fact that the floor system is configured to be substantially self-supporting and is substantially mechanically uncoupled from the fuselage airframe as a primary structure, the floor system can be modified substantially independently of static requirements or structural peripheral conditions of the fuselage airframe. Consequently, it is possible for the first time to adapt a layout of a passenger cabin of an aircraft to customer-specific special requests at a low refit expense. The mechanical loads emanating from the floor system are substantially exclusively introduced into the fuselage airframe or into the fuselage airframe structure, while conversely virtually no forces from the fuselage airframe are transferred into the self-supporting floor system.

A development of the floor system provides that attached in a lower region of the fuselage airframe are at least two longitudinal supports, on which is arranged in each case at least one support member, in particular at least one lattice-type bracing, at least one crossbar for supporting and attaching the floor members being arranged in each case on the at least two opposing support members. As a result of this arrangement, loads emanating from the floor system parallel to a vertical axis (z-axis) of the aircraft are introduced in a statically advantageous manner via the support members directly into preferably two, preferably continuous lower (base) longitudinal supports which run in a uniform parallel spacing on both sides from a base line or crown line of the fuselage airframe and parallel to the x-axis and are attached in a lower region of the fuselage airframe (so-called "bilge") inside the hold. In an alternative embodiment, both longitudinal supports can also be secured in the fuselage airframe running in unequal spacings parallel to the base line or the crown line of the fuselage airframe. The base line or the crown line passes through the lowest or highest point of a shape which is defined by the cross-sectional geometry of the fuselage airframe and which, in the simplest case, is a circle. The cross-sectional geometry can vary in portions along a longitudinal axis of the aircraft (x-axis) in the direction of flight.

Crossbars which run in a parallel spacing with respect to one another are attached to the support members in each case parallel to a transverse axis of the aircraft (y-axis). In turn, attached to the crossbars are longitudinal profiled parts which run parallel to the x-axis of the aircraft, are preferably configured as seat rail profiled parts and on which are arranged floor members with optional functional members for providing a floor in the fuselage airframe. The floor members can be attached to the seat rail profiled parts using the same standard metal fittings which are usually used in civil aviation for attaching the seats in passenger cabins.

Alternatively, any type of riveting, screwing, clamping or insertion members can be used. Furthermore, welded or adhesive bonded joints can optionally also be used.

In the simplest case, each support member on the lower longitudinal supports is configured as a fixed vertical strut or as a longitudinally adjustable Samer rod which, in the normal flying state, primarily absorbs the forces arising from the floor parallel to the z-axis. However, for static reasons it will generally be necessary to reinforce two adjacent vertical struts in each case in a lattice-type manner by additional diagonal struts in order to also introduce forces which substantially arise parallel to the x-axis into the longitudinal supports located on the underside. Generally, it is not necessary to provide a vertical strut in the region of each annular former. Instead, it is usually sufficient to arrange merely one vertical strut on each fifth to tenth annular former. In a variant, on each of the two lower longitudinal supports, a lattice-type support member of this type extends over a total length of the longitudinal supports at a constant height. Alternatively, the support members can be configured as individual freestanding support members ("trestles") which are arranged at a distance from one another on the longitudinal supports. Furthermore, upwards the support members can preferably have a respective continuous upper longitudinal support which runs substantially parallel to the two longitudinal supports arranged in the lower region of the fuselage airframe. Arranged on the upper longitudinal supports parallel to the y-axis are crossbars and, in turn, arranged on said crossbars parallel to the x-axis are longitudinal profiled parts to support and attach floor plates to provide a floor surface.

In each case, horizontally running longitudinal struts with a smaller bending moment compared to the longitudinal supports and which, in conjunction with the optionally provided diagonal struts, form a lattice-type structure of the support members can optionally be provided in each case on the upper ends of respectively adjacent vertical struts. Where there is a sufficient inherent rigidity of the seat rail profiled parts or of the floor members, it is optionally possible to dispense with at least some of the longitudinal struts.

In a further alternative embodiment, the crossbars can be directly connected to the upper ends of the vertical struts, the entire arrangement being stabilised in respect of forces acting parallel to the x-axis by the floor members which rest on and are attached to the crossbars. Due to the construction of the floor which is mechanically substantially uncoupled from the fuselage airframe according to the invention, it is even possible to make comprehensive changes to the floor without considering possible static requirements of the fuselage airframe, thereby simplifying the adaptation to customer-specific layout requests.

According to a further advantageous configuration of the floor system, it is provided that the support members have differently fixed heights in relation to a z-axis (vertical axis of the aircraft). Consequently, for the first time it is possible to provide a floor in a fuselage airframe of a passenger or freight aircraft which is not a plane extending over the entire length of the aircraft. For example, in a front region of the fuselage airframe, the floor can be raised to increase the size of the hold, while in a rear region of the fuselage airframe the floor is lowered, forming a step, in order to increase the travel comfort for the passengers as a result of an increased cabin volume.

A further advantageous configuration of the floor system provides that the support members can be vertically adjusted parallel to the z-axis. This measure further increases the flexibility of the floor system in respect of requested changes to the floor layout, since an adaptation of the floor level is realised in regions by a vertical adjustment, preferably made by motor or by hand, of the respective support members. A displacement of support members of a different height on the respective longitudinal support is no longer necessary. For example, in this case the support members can be configured as scissors which can be actuated by a motor, for example by an electromotive spindle drive ("scissor lift table"), in order to produce a preferably continuous vertical adjustment between the longitudinal supports and the crossbars. Scissor arrangements of this type with crossed struts are widely used in so-called "scissor tables" or lift tables.

According to a further development of the floor system, it is provided that the support members can be moved and locked on the longitudinal supports parallel to a y-axis. This makes it easily possible to interchange the position on the longitudinal supports of higher support members with those of lower support members by transposing or moving them in order to reconfigure the layout of the floor at the lowest possible refit expense. In this variant, the longitudinal supports preferably have in the region of an upper side a rail-like guide means in which the support members are accommodated such that they can be moved and fixed parallel to the y-axis (i.e. along the x-axis). In this respect, it is possible for so-called "passing places" to be provided in the guide means to allow the support members to pass one another without having to be lifted out of the guide means—at least when the crossbars have been removed. In this respect, the support members can be attached to the longitudinal supports continuously or alternatively in grids.

A further advantageous development of the floor system provides that at least one crossbar can be moved and locked on at least two support members parallel to the y-axis. This makes it possible for the floor to be specifically adapted to load conditions which have changed. For example, crossbars can be moved and locked parallel to the y-axis (i.e. along the x-axis) for local reinforcement in a region where, for example, a galley and/or a sanitary module are to be positioned on the floor. In this configuration, the support members attached to the longitudinal supports each have a continuous, upper longitudinal support, on which the ends of the crossbars are respectively accommodated in a movable and lockable manner. The crossbars are attached to the upper longitudinal supports by known screw, clamping or insertion connections which can be detached again if required.

According to a development of the floor system, it is provided that at least two longitudinal profiled parts, in particular at least two seat rail profiled parts can be moved and locked on at least two crossbars parallel to the x-axis in order to attach thereto at least one functional member, in particular respectively at least one group of seats with at least two seats. Due to the longitudinal profiled parts which can be moved and fixed on the crossbars transversely to the longitudinal axis of the aircraft (i.e. parallel to the x-axis), the layout of seats on the floor can be changed easily and quickly. Thus, for example, it is possible by moving the longitudinal profiled parts or the seat rail profiled parts and by adding two further longitudinal profiled parts, to convert a seating arrangement with two rows of seats with in each case three seats and one centre aisle into a seating arrangement with three rows of seats with in each case two seats and two aisles. The longitudinal profiled parts are attached to and locked on the crossbars by suitable screw, clamping or insertion connections which can be detached if required.

A further advantageous development of the floor system provides that at least one support member is connected at least in portions to the fuselage airframe by at least one side connection, in particular a framework, dampers, ropes or straps. This measure prevents the support members from tilting in the direction of the y-axis under the effect of transverse forces. To laterally couple the floor system with the fuselage airframe or with the annular formers attached on the inside in the fuselage airframe, pneumatically and/or hydraulically acting damping members for example can be used, the length of which can preferably be adjusted continuously for tolerance compensation. The ropes or straps are preferably formed from interlaced carbon fibres or carbon fibre strands. The framework preferably consists of reinforcing struts which, from a static viewpoint, are advantageously arranged triangularly.

According to a further advantageous development, at least two opposing support members are reinforced in respect of forces acting parallel to the y-axis, in particular by triangular struts arranged on both sides in the region of overhanging ends of a crossbar resting on the two support members. Consequently, the floor system becomes substantially static independently of the surrounding fuselage airframe, in other words the entire floor system including the substructure and the floor positioned thereon or the floor members with the functional members stands "freely" in the fuselage airframe.

A further advantageous configuration provides that at least two longitudinal supports are attached in an upper region of the fuselage airframe and in each case at least one support member, in particular at least one lattice-type bracing, is suspended from a respective longitudinal support and in each case at least one crossbar is arranged on the at least two support members in order to secure floor members.

This configuration with floor members "suspended" from the crown region of the fuselage airframe is an "inverted" variant of the floor system. The advantage of this configuration is that, instead of being loaded in compression parallel to the z-axis, the support members are substantially only loaded in tension, so that the support members can be formed at least partially with weight-reducing ropes or straps.

A development of a floor member for the floor system provides that the at least one floor member has at least one functional member, in particular a seat, a group of seats, a galley and/or a sanitary module. Compared to the conventional attachment of assemblies by discrete connection points, this arrangement achieves a more even load introduction, distributed over the surface of the floor member, into the entire floor system, thereby allowing a statically weight-saving configuration of the seat rail profiled parts and of the crossbars. Depending on the inherent rigidity or strength of a base plate of the floor member, said base plate can possibly take over, at least to some extent, the static function of the seat rail profiled parts and/or of the crossbars, no that in an ideal situation these become completely dispensable. Alternatively, regions of the floor system can be provided with floor members without functional members.

Furthermore, the floor members can be positioned with integrated functional members in a spatially more flexible manner on the floor system and can also be assembled with less effort.

Further advantageous embodiments of the floor system are set out in the further claims.

DESCRIPTION OF EXEMPLARY EMBODIMENTS

Figure 1:
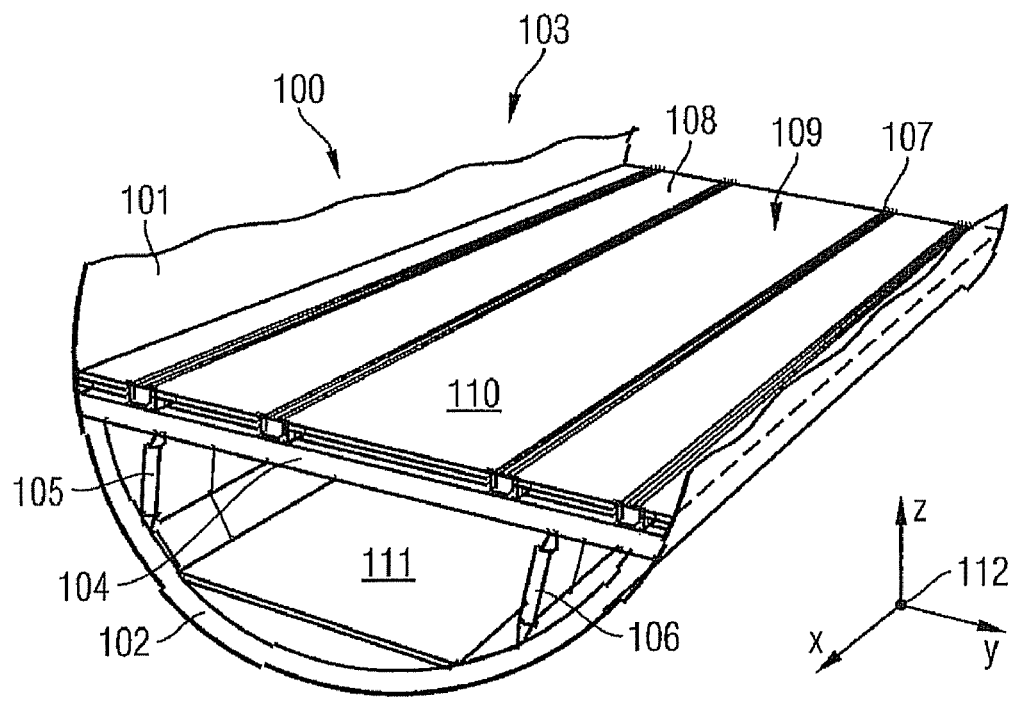
FIG. 1 shows a floor frame, known from the prior art, for an aircraft.

In assemblies which each have a relatively large number of functionally identical members, for example a support member configured as a lattice or the like to improve clarity, only one reference numeral will generally be provided—as long as reference is not made explicitly thereto in the associated description of the figure.

FIG. 1 is a perspective view of a floor system according to the prior art. A fuselage airframe 100 of an aircraft (not shown) with a substantially circular cross-sectional geometry comprises, inter alia, a fuselage cell skin 101 with a plurality of annular formers arranged therein, of which only the foremost annular former 102 is provided with a reference numeral. A floor system 103 of the fuselage airframe 100 comprises, inter alia, a plurality of crossbars 104. The crossbar 104 is connected on both sides to an annular former 102. In addition, the crossbar 104 is supported downwards by two conventional Samer rods 105, 106 arranged between the crossbar 104 and the annular former 102. Furthermore, attached to the crossbar 104 are a total of four seat rail profiled parts, of which only one seat rail profiled part 107 is provided with a reference numeral. Seats for the passengers are attached to the seat rail profiled parts. Inserted and attached between two seat rail profiled parts is a respective floor plate, of which only one floor plate 108 has been provided with a reference numeral. The floor plates form a continuous and planar floor 109 inside the fuselage airframe 100, by which the fuselage airframe 100 is divided over its longitudinal extent into a passenger cabin 110 and a hold 111. The spatial orientation of the components is indicated by a coordinate system 112 in FIG. 1 and in all the following figures. An x-axis of the coordinate system 112 corresponds to a longitudinal axis of the aircraft (in the direction of flight), a y-axis corresponds to a transverse axis of the aircraft and the z-axis corresponds to a vertical axis of the aircraft, the z-axis being directed away from the ground.

Figure 2:
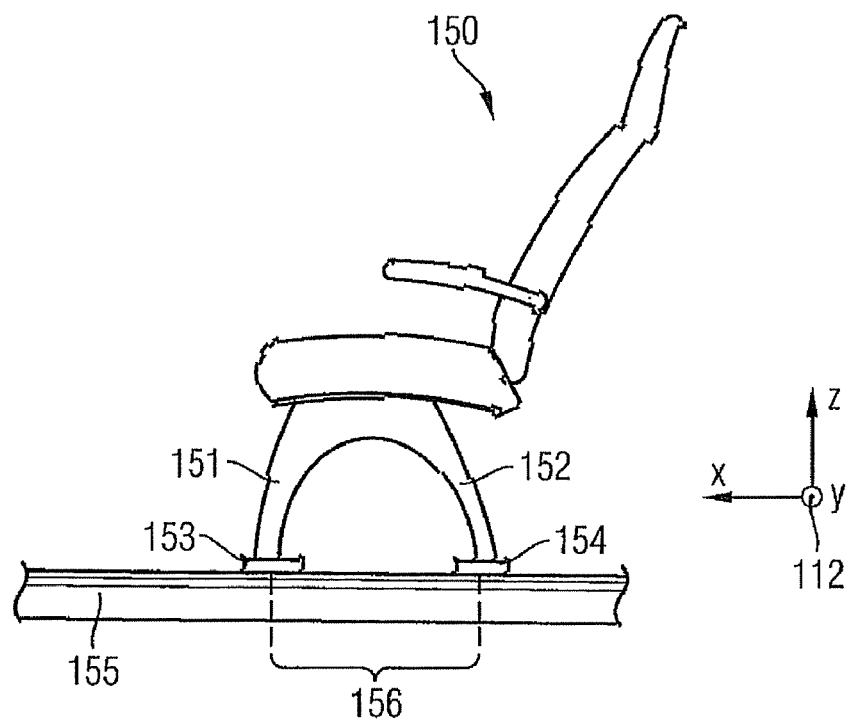
FIG. 2 shows a conventional seat for a passenger to be attached to the floor frame according to FIG. 1.

FIG. 2 is a simplified perspective view of a seat which is configured according to the prior art and is to be attached to standardised seat rail profiled parts. A seat 150 for a passenger has four legs or leg struts with in each case an attachment point arranged on the end, of which only legs 151 and 152 as well as attachment points 153 and 154 are visible here. The seat 150 is locked on the seat rail profiled part 155 through the attachment points 153 and 154 by means of conventional screw, clamping or insertion connections in a grid spacing of 2.54 cm. A spacing 156 between the attachment points 153, 154 parallel to the x-axis regulates the attachment possibilities for the seat, since as many crossbars as possible should run (parallel to the y-axis) in the region of attachment points 153, 154, due to the high loads in accident situations. Furthermore, the spacing 156, in conjunction with a centre of gravity (not shown) of the seat 150, forms a significant lever by which considerable forces are introduced into the seat rail profiled part 155, which accordingly must be of a solid configuration.

Figure 3:
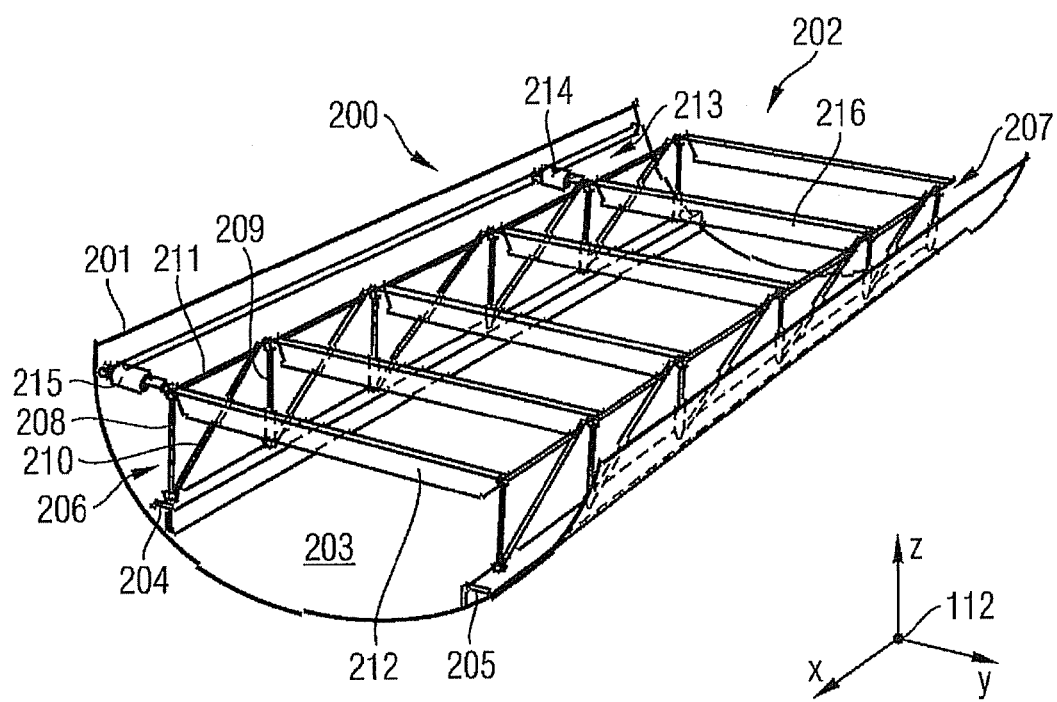
FIG. 3 shows a floor system configured according to the invention.

In contrast to FIG. 1, FIG. 3 shows a floor system configured according to the invention. A floor system 202 is integrated into a fuselage airframe 200 with a fuselage cell skin 201. The floor system 202 comprises, inter alia, two longitudinal supports 204 and 205 (platforms or base longitudinal supports) which run parallel to one another in a lower region 203 of the fuselage airframe 200. Arranged on each longitudinal support 204, 205 is a lattice-type support member 206, 207 which, in the illustrated embodiment, extends over the entire length of each longitudinal support 204, 205.

The support members 206, 207 each have a plurality of vertical struts, of which two front vertical struts 208, 209 on longitudinal support 204 have a reference numeral. A diagonal strut 210 is arranged between the two vertical struts 208, 209 for reinforcement purposes. The same applies accordingly to the rest of the vertical struts. Arranged on upper ends of the vertical struts 208, 209—as well as between all other respectively adjacent vertical struts—is a respective longitudinal strut 211 which runs parallel to the x-axis. The vertical struts 208, 209 can be of a rigid or resiliently damping configuration. If the vertical struts 208, 209 are rigid, they are formed, for example, by Samer rods which in any case allow a longitudinal adjustability parallel to the z-axis. Alternatively, the vertical struts 208, 209 can be formed by hydraulic and/or pneumatic damping members, optionally combined with spring members. Due to this configuration, upward and downward movements of the aircraft, in particular parallel to the z-axis, induced inter alia by turbulence, are compensated, thereby enhancing the passenger comfort. Alternatively, the hydraulic and/or pneumatic damping members can also be actively controlled, so that the floor surface of the floor system 202 can be actively stabilised in real time in its spatial position, in particular in relation to the xy-plane, based on, for example, data already present in the flight computer. For this purpose, the vertical struts can have actuators which can be moved parallel to the z-axis in particular. Any controllability of the damping members means in this connection that the damping members can be moved parallel to the z-axis and, furthermore, the damping and spring behaviour, controlled by a control means, can be actively adjusted as a function of the current flight data which can originate, for example, from the flight computer. Positioned on the support members 206, 207 running on both sides in the fuselage airframe 200 is also a plurality of crossbars, of which only one crossbar 212 has been given a reference numeral. The mutual spacing of the crossbars in the x-direction preferably corresponds to the spacings of the annular formers (not shown) which are connected to the fuselage cell skin 201. In the illustrated embodiment of FIG. 3, an exemplary unilateral (asymmetrical) side connection 213 of the crossbar 212 to the fuselage airframe 200 is provided for lateral support. The unilateral side connection 213 is formed above the longitudinal support 204 on support member 206 with two preferably longitudinally adjustable Samer rods 214, 215 in the region of the first crossbar 212 and in the region of the fifth crossbar 216 in order to achieve in particular a stabilisation of the floor system 202 relative to loads acting parallel to the y-axis. A side connection of this type can also be provided on the side of the second longitudinal support 205. The side connection 213 is usually only necessary on each fifth to tenth crossbar or annular former. The floor system 202 is substantially stabilised with respect to loads acting parallel to the z-axis by the vertical struts 208, 209, while the diagonal struts 210 introduce forces acting in the direction of the x-axis in particular into the two longitudinal supports 204, 205.

All the components described above can be connected by any type of riveting, screwing, clamping or insertion members or by any combination thereof. Diverging from mechanical connection or attachment means, the mentioned components can also be joined together by welding and/or adhesive bonding processes.

Figure 4:
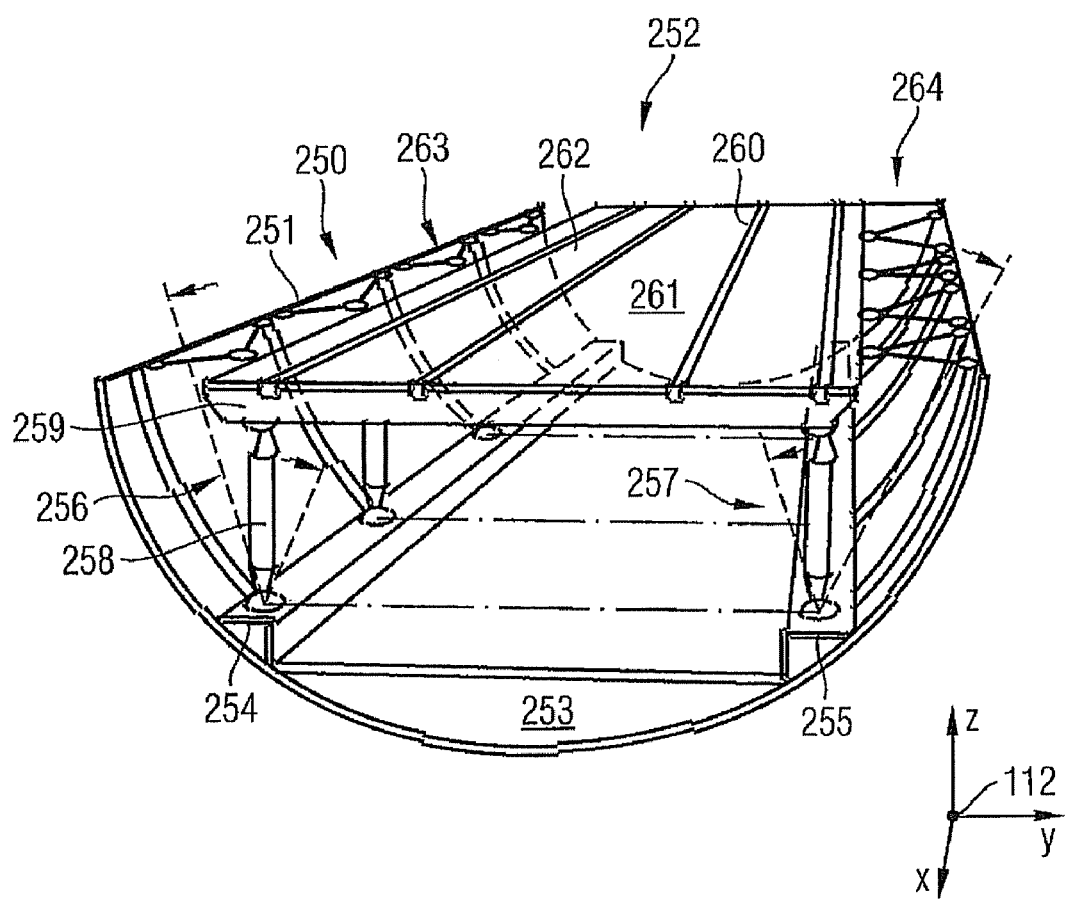
FIG. 4 shows a variant of the floor system.

FIG. 4 illustrates a further variant of the floor system with a bilateral side connection. A further alternative embodiment of a floor system 252 is installed into a fuselage airframe 250 with a fuselage cell skin 251. Here again, two longitudinal supports 254, 255 which run parallel to the x-axis are attached in a lower region 253 of the fuselage airframe 252. Resting on each of the longitudinal supports 254, 255 is a respective support member 256, 257 with a plurality of vertical struts, of which only one vertical strut 258 has been given a reference numeral. For the rest, the construction of the support members 256, 257 is the same as the construction of the support members 206, 207 according to FIG. 3. A plurality of crossbars 259 is positioned on the support members 256, 257. A plurality of seat rail profiled parts, one of which has reference numeral 260, run on the crossbars 259. In order to form a planar, self-contained and walkable floor surface 261, a plurality of floor members, of which only one floor member 262 has been referenced, is positioned on the crossbars 259. Unlike the embodiment according to FIG. 3, the floor system 252 has two bilaterally (symmetrically) arranged side connections 263, 264 which are formed by way of example with ropes or straps braced diagonally between the floor system 252 and the fuselage airframe 250. The ropes or straps can be formed, for example, using interlaced carbon fibres or carbon fibre strands. Alternatively, they can have a limited amount of elasticity in order to be able to more effectively intercept and absorb forces parallel to the y-axis in particular, while avoiding load peaks (so-called "lateral impacts"). If necessary, the resilient ropes or straps have to be combined with suitable hydraulic and/or pneumatic damping members to reduce undesirable vibration phenomena. Instead of being formed from carbon fibres, the ropes or straps can be formed, for example, using aramide fibres. Kevlar fibres, natural fibres or any combination thereof.

Figure 5:
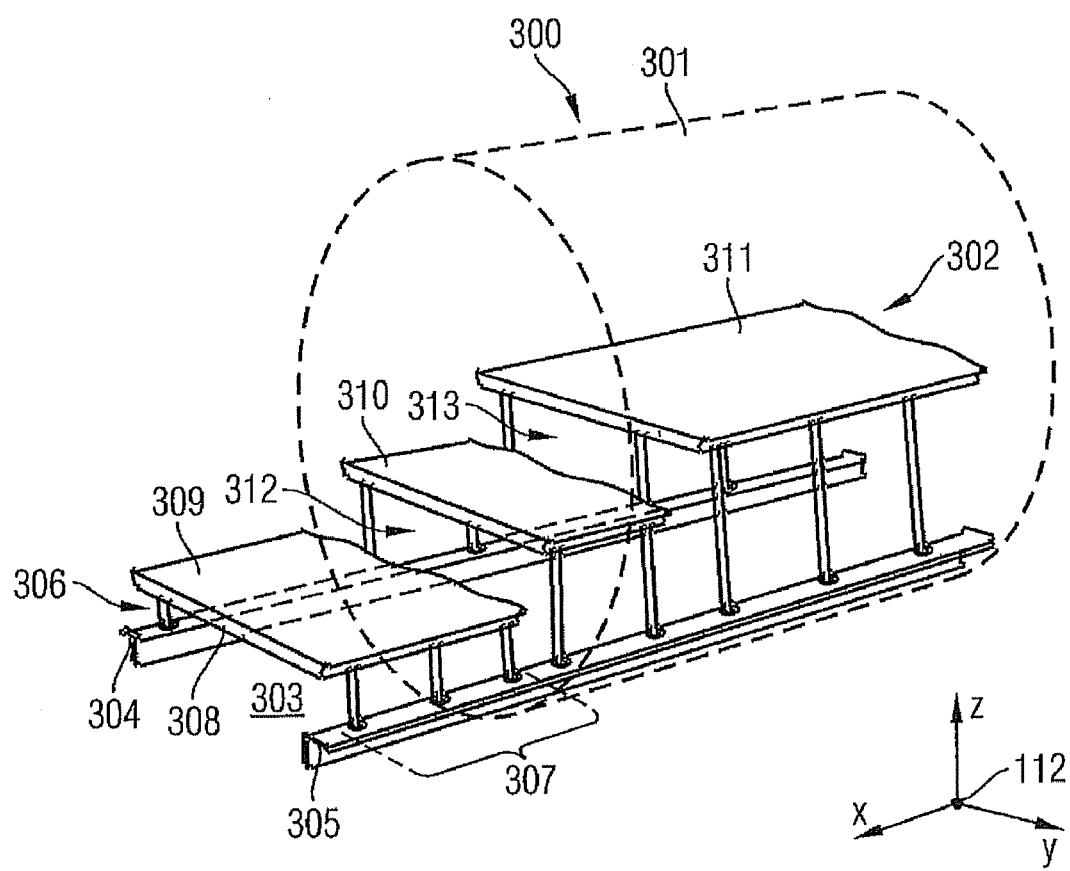
FIG. 5 shows a further variant of the floor system with a (fixed) height which differs in certain regions.

FIG. 5 shows a second variant of the substructure according to the invention with a height which, although differing in certain regions, is fixed. A floor system 302 is integrated into a fuselage airframe 300 with a fuselage cell skin 301. The entire floor system 302 is supported on two continuous longitudinal supports 304, 305 attached in a lower region 303 of the fuselage airframe 300. Unlike the variants according to FIGS. 3 and 4, in each case three support members, of which only two front support members 306, 307 have been provided with a reference numeral, are arranged on each longitudinal support 304, 305. All the support members 306, 307 are connected to a plurality of crossbars, of which likewise only one crossbar 308 has been provided with a reference numeral. Furthermore, parallel to the x-axis of the coordinate system 112, it is possible for seat rail profiled parts (not shown) to be provided, on which and/or between which three floor members 309 to 311 are attached. As a result of the respectively graduated differing heights of the support members of the floor system 302, which support members are attached in tandem to the longitudinal supports 304, 305, the three floor members 309 to 311 form, in contrast to the previous variants, a stepped, non-planar floor surface with two steps 312, 313 or levels. Since the floor system 302 has been substantially mechanically uncoupled or detached from the primary structure of the fuselage airframe 300, it is possible for a respective height of the support members and thus a height of the floor members 309 to 311 resting thereon to be broadly selected as desired in relation to the z-axis and in particular independently of possible static restrictions of the fuselage airframe 300. Consequently, completely new configuration possibilities within aircraft fuselage airframes are presented, compared to previously known embodiments of floor systems.

Figure 6:
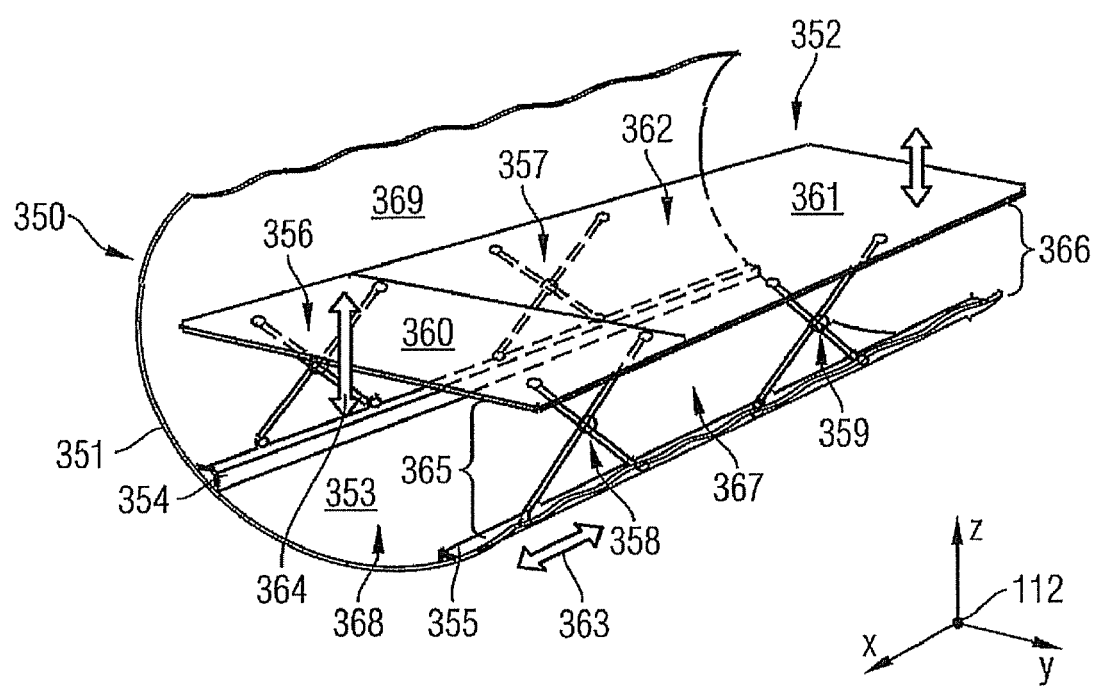
FIG. 6 shows a further alternative variant of the floor system with the possibility of a level adjustment at least in certain regions.

FIG. 6 is a greatly schematised view of a progressively vertically adjustable floor system. A floor system 352 is arranged in a fuselage airframe 350 with a fuselage cell skin 351. Two longitudinal supports 354, 355, inter alia, are attached in a lower region 353 of the fuselage airframe 350. Two support members 356, 357 are arranged on longitudinal support 354 and two support members 358, 359 are arranged on longitudinal support 355. Floor members 360, 361 are positioned on the support members 356 to 359 to provide a floor surface 362. In this embodiment of the floor system 352, the support members 356 to 359 are respectively configured as (lift) scissors with in each case two crossed struts which allow a continuous vertical adjustment.

By moving in each case at least one strut (not provided with a reference numeral) in scissors of a support member 356 to 359 along the x-axis of the coordinate system 112 in the direction of arrow 363, the height of the support members 356 to 359 can preferably be continuously adjusted within a wide range in a vertical direction, i.e. parallel to the z-axis in the direction of arrow 364. Each support member 356 to 359 has respectively two intersecting struts. At least two struts of each support member 356 to 359 are accommodated such that they can be moved in the longitudinal supports 354, 355 or below the floor members 360, 361 in the direction of the x-axis.

As a result of the simultaneous adjustment of the two front support members 356, 358 with the same adjustment path, for example the front floor member 360 can be brought to a height 365 which can be varied within wide limits, while as a result of the simultaneous adjustment of the two rear support members 357, 359, it is possible to vary a height 366 of the rear floor member 361. Consequently, the two floor members 360, 361 of the floor surface 362, in conjunction with the four support members 356 to 359, form a respective progressively vertically adjustable "scissor lift table". In order to prevent the floor members from undesirably tilting around the x-axis (slanted position of the floor surface 362 in respect of the xy-plane), the respectively opposing support members 356, 358 and 357, 359 are moved synchronously parallel to the z-axis.

In the illustrated embodiment of FIG. 6, the heights 365, 366 are adjusted identically, thus producing a continuous, planar floor surface 362. Different heights 365, 366 can for example be adjusted, for example if a front hold 368 which is larger than a rear hold 367 is to be provided under the front floor member 360. The passenger cabin is located inside the fuselage airframe 350 above the floor surface 362. Although a height adjustment of the floor members 360, 361 during flight operation is not provided in this variant, it is possible in principle.

Figure 7:
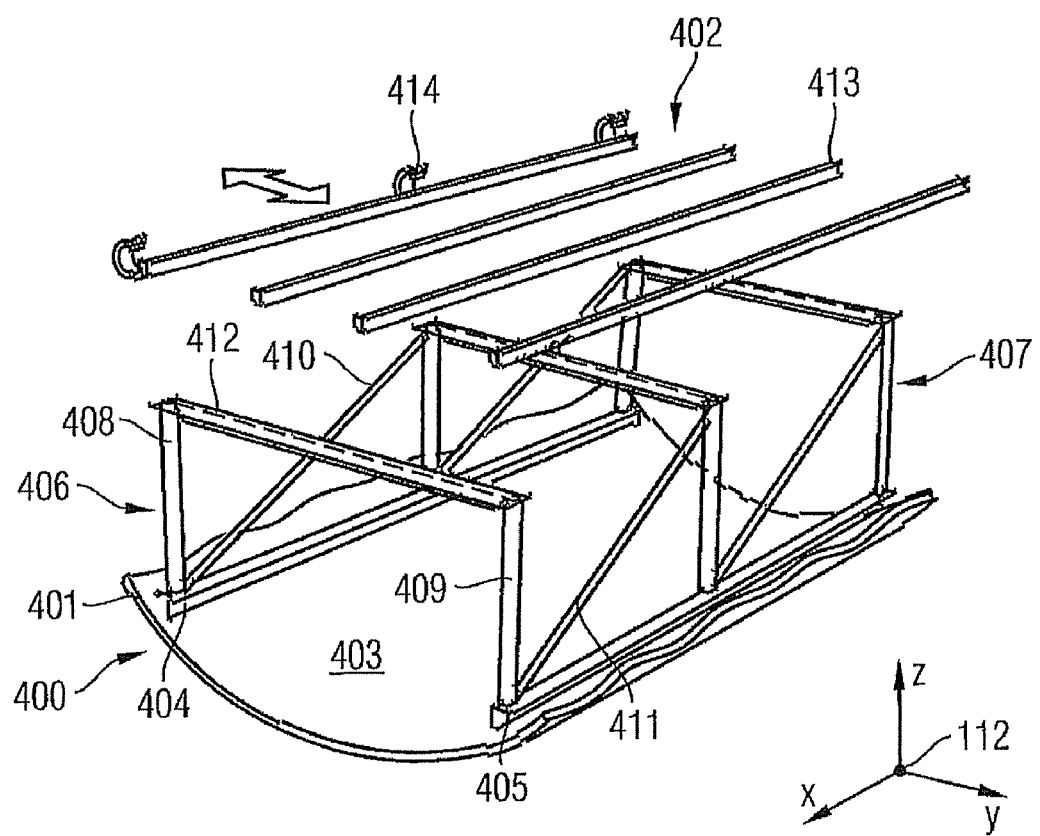
FIG. 7 shows a variant with longitudinal profiled parts, in particular seat rail profiled parts, which can be moved parallel to the x-axis.
Figure 8:
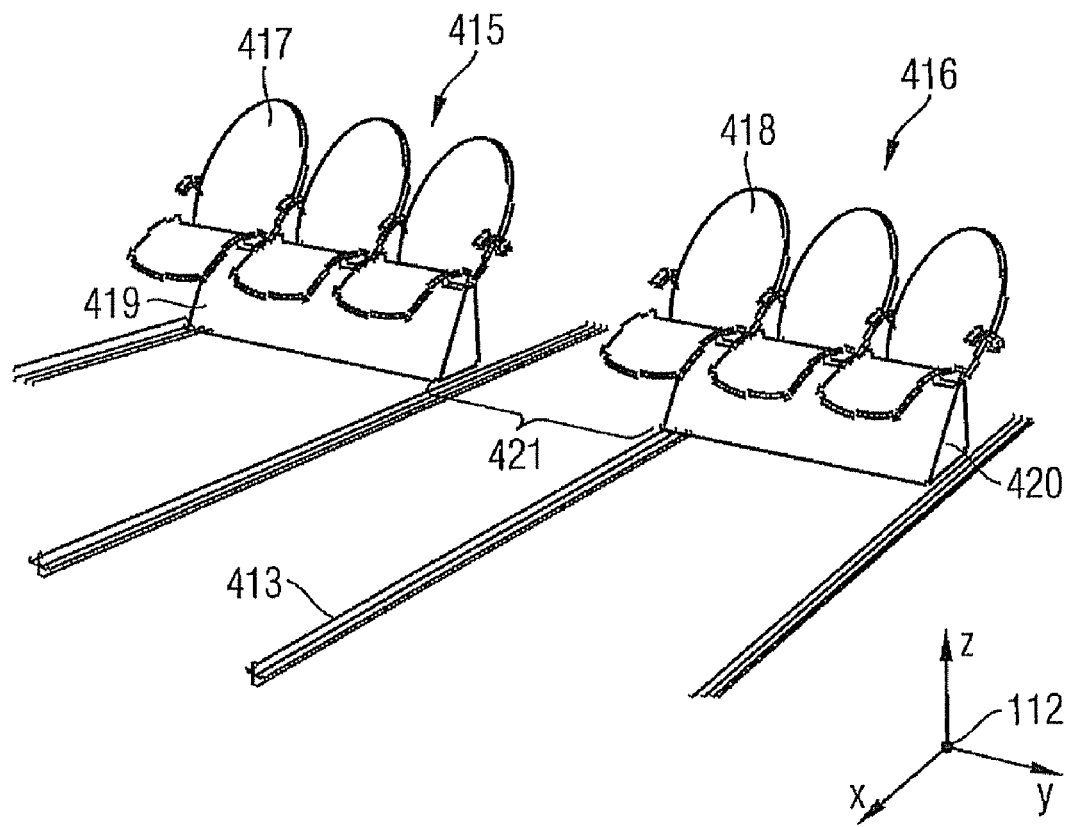
FIG. 8 shows two groups of seats as optional functional members of the floor system.

Reference will be made at the same time to FIGS. 7 and 8 during the further course of the description.

FIG. 7 illustrates a further embodiment of the floor system, while FIG. 8 shows two groups of seats as functional members which can be combined with the floor system.

A fuselage airframe 400 with a fuselage cell skin 401 is fitted with a further variant of a floor system 402. Two longitudinal supports 404, 405 run parallel to the x-axis of the coordinate system 112 in a lower region 403 of the fuselage airframe 400. The support members 406, 407 are formed by a plurality of vertical struts running parallel to the z-axis and diagonal struts arranged in each case between two vertical struts. Of the vertical struts and the diagonal struts, only two front vertical struts 408, 409 and the associated diagonal struts 410, 411 have been provided with reference numerals. Attached to the vertical struts 408, 409 and to the further undesignated vertical struts are in each case crossbars, of which only a front crossbar 412 has been provided with a reference numeral, said crossbars each running parallel to the y-axis. Arranged on the crossbars in the illustrated embodiment are four seat rail profiled parts as longitudinal profiled parts, of which one seat rail profiled part 413 has a reference numeral in representation of all the others. The seat rail profiled parts are attached to the crossbars by a plurality of attachment means, of which a clamp-like attachment means 414 has been provided with a reference numeral.

However, the seat rail profiled parts can be freely positioned before attachment parallel to the x-axis (or in the direction of the y-axis) on the crossbars 412, as indicated by the white double arrow. As a result of such a displacement of two seat rail profiled parts parallel to the y-axis by respectively the same amount, for example an aisle width can be varied between two groups of seats locked in each case on two seat rail profiled parts (a group of two seats or three seats for passengers (cf. FIG. 8); not shown). The attachment means 414 can be any riveting, screwing, clamping or insertion connections or members or any combination thereof. For the locally variable and optionally grid-like attachment of the seat rail profiled parts on the crossbars, grooves, recesses, hollows, clasps, clamps, catches or any combination thereof can also be used.

FIG. 8 illustrates two optional functional members which can be used as part of the floor system in the region of an interior of an aircraft. Alternatively, the functional members can be configured as galleys, sanitary modules, storage modules, floor members or any combination thereof.

In the illustrated embodiment of FIG. 8, the two functional members 415, 416 are configured as groups of seats 417, 418, and—unlike passenger seats of the prior art (cf. FIG. 2)—in each case three seats for passengers are combined in each group of seats 417, 418. Each group of seats 417, 418 has an adapter 419, 420 or a connection member which is configured by way of example in FIG. 8 as a compact prism, although in principle it can have a cuboidal shape or any other geometric shape. Lower connection regions of the adapters 419, 420 are connected to the seat rails by suitable attachment means, while the seats themselves are mechanically connected to the adapters in an upper connection region of the adapter. In addition to the functional members 415, 416, the adapters 419, 420 are integral components of the floor system 402 and, as such, allow a simple and time-saving connection in terms of assembly of the seats, usually manufactured by external suppliers, to the airbus-specific floor system which is used in the specific individual case. Alternatively, the functional members 415, 416 can also be configured as components of floor members.

Between the two groups (of three) seats 417, 418, there is an indicated aisle width 421 or a spacing (determined along the y-axis between any functional members). The width of the aisle 421 can be varied, if required, by moving at least two seat rail profiled parts 413 parallel to the x-axis on the crossbars which are usually located underneath.

Figure 9:
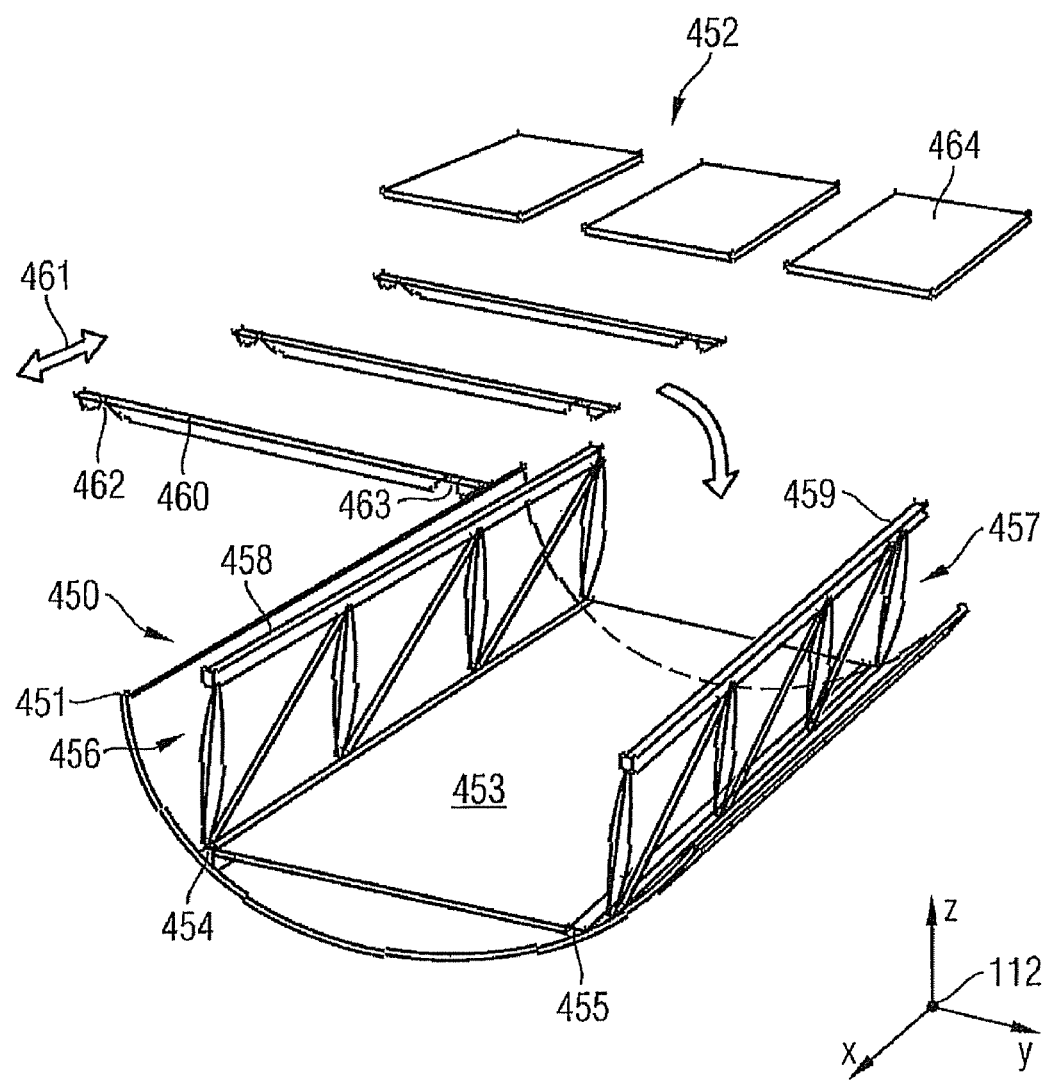
FIG. 9 shows a variant with crossbars which can be moved and locked parallel to the y-axis.

FIG. 9 shows a further alternative embodiment of the floor system according to the invention.

The floor system 452 is integrated into a fuselage airframe 450 with a fuselage cell skin 451. In a lower region 453, two longitudinal supports 454, 455 run in each case in a mutual parallel spacing and in each case parallel to the x-axis of the coordinate system 112. Arranged on the longitudinal supports 454, 455 is a respective lattice-type support member 456, 457 which is formed by a plurality of vertical struts configured as Samer rods, as well as diagonal struts positioned between respectively two adjacent vertical struts. On their upper sides, both support members 456, 457 have a respective continuous upper longitudinal support 458, 459 which preferably have the same longitudinal extent as the (lower) longitudinal supports 454, 455.

Furthermore, the floor system 452 has a plurality of crossbars, of which only one crossbar 460 has been provided with a reference numeral and which are attached to the upper longitudinal supports 458, 459 in any position in the direction of the x-axis, as symbolised by arrow 461, by attachment means (not shown). The crossbars have a respective recess at each end to prevent an uncontrolled displacement on the upper longitudinal supports 458, 459 in the direction of the x-axis and y-axis. The bilateral recesses 462, 463 in the front crossbar 460 have been provided with a reference numeral in representation of the others. The curved arrow symbolises a preferred attachment direction of the crossbars on the upper longitudinal supports 458, 459 of the support members 456, 457 of the floor system 452. Floor members 464, of which only one has been provided with a reference numeral in representation of the remaining two, are respectively arranged and attached between and/or on the crossbars 460, to provide a planar floor surface.

Figure 10:
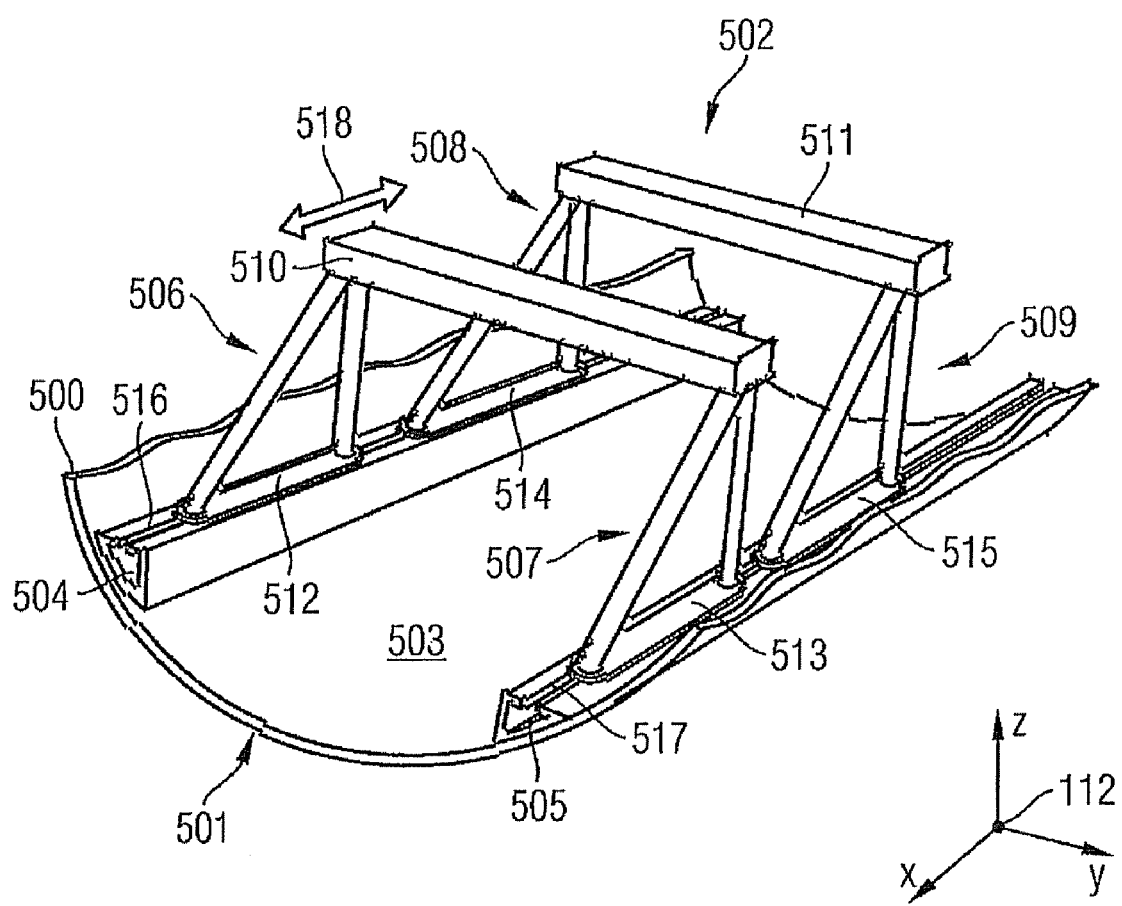
FIG. 10 shows an embodiment with ("trestle-shaped") support members which can be moved and locked parallel to the y-axis.

FIG. 10 shows a further variant of the floor system according to the invention.

A fuselage airframe 500 with a fuselage cell skin 501 is provided with a floor system 502. A lower region 503 of the fuselage airframe 500 is in turn provided with longitudinal supports 504, 505 which run on both sides parallel to the x-axis of the coordinate system 112 and on which four support members 506, 507 and 508, 509 are arranged. Attached to the support members 506, 507 is a crossbar 510 and positioned on the support members 508, 509 is a crossbar 511. Floor members not shown in FIG. 10 are arranged on or between the crossbars 510, 511 to form the floor surface in a passenger cabin of an aircraft. Each of the four support members 506 to 509 has a vertical strut and a diagonal strut which have not been provided with reference numerals for reasons of clarity. In each case an upper end of a diagonal strut and an upper end of a vertical strut are brought together at one end of a diagonal strut, while the corresponding lower ends of the struts are attached to four straps 512 to 515. The straps 512 and 514 on the (left-hand side) support members 506, 508 are accommodated such that they can be moved and locked inside the longitudinal support 504 in the direction of the x-axis in a rail-like guide means 516 (for example a groove with a reverse T-shaped cross-sectional geometry). The same applies to the straps 513, 515 which slide in a guide means 517.

This configuration makes it possible for the crossbars 510, 511 to move along the x-axis (longitudinal axis of the aircraft) at any point in the direction of arrow 518 and to be fixed there. Consequently, a greater number of crossbars 510, 511 can be positioned, for example in those regions of the floor surface in which higher loads arise due to functional members, in particular parallel to the z-axis.

Figure 11:
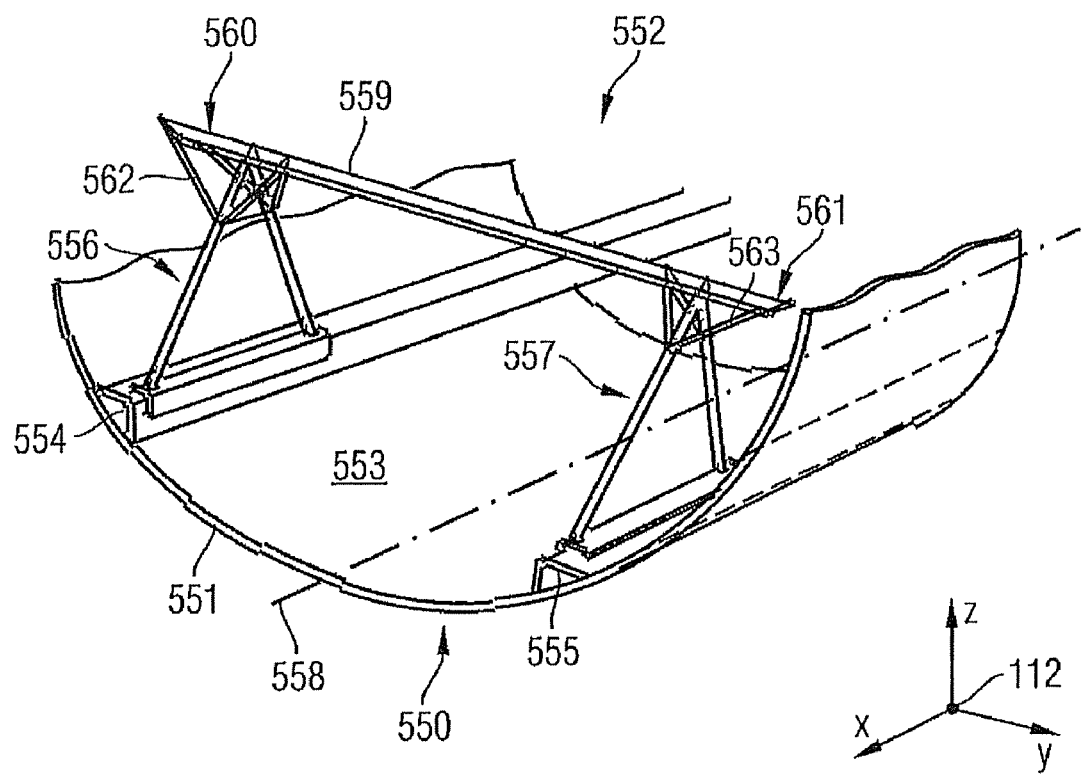
FIG. 11 shows a "freestanding" floor system with additionally braced crossbars which overhang on both sides.

FIG. 11 illustrates a further variant of the universal floor system.

A floor system 552 is integrated into a fuselage airframe 550 with a fuselage cell skin 551. The floor system 552 comprises, inter alia, longitudinal supports 554, 555 integrated in a lower region 553 of the fuselage airframe 550. Both longitudinal supports 554, 555 run parallel and with respectively the same spacing from a base line 558. Arranged on the longitudinal supports 554, 555 is a respective support member 556 and 557, which support members are connected by a crossbar 559. The crossbar 559 runs substantially parallel to the y-axis of the coordinate system 112. Unlike the previous variants, the crossbar 559 is configured such that it overhangs with respect to the support members 556, 557, in other words the crossbar 559 has in the region of the two support points (not shown) on the support members 556, 557 respectively outwardly directed projecting ends 560, 561 (so-called overhanging ends). The two projecting ends 560, 561 are braced with approximately triangular struts 562, 563 with upper ends (not described in more detail) of the support members 556, 557. Due to the effect of the triangular struts 562, 563, both support members 556, 557, in conjunction with the supported crossbar 559, are stabilised in respect of loads which act parallel to the y-axis, no that the entire substructure consisting of the two support members 556, 557, the crossbar 559 and the two struts 562, 563 can be completely detached and attached to the two longitudinal supports 554, 555 independently of the primary structure of the fuselage airframe 550. This provides completely new and very flexible configuration possibilities in respect of the novel floor system 552, since it is no longer necessary to take into account possible static peripheral conditions of the fuselage airframe 550 when modifying the floor system 552. Furthermore, it is also an advantage of this configuration that a side connection of the support members 556, 557 to the fuselage airframe 550 or to the annular formers (not shown) is not required.

In the fuselage airframe 550, to provide the floor system 552, a plurality of correspondingly configured support members 556, 557 with crossbars 559 respectively resting thereon and attached thereto is arranged and attached offset in tandem in each case in respect of the x-axis to provide a support surface for floor members (not shown) on the longitudinal supports 554, 555. In the simplest case, the floor members resting on and attached to the crossbars 559 form a continuous floor surface on which passengers can walk.

Figure 12:
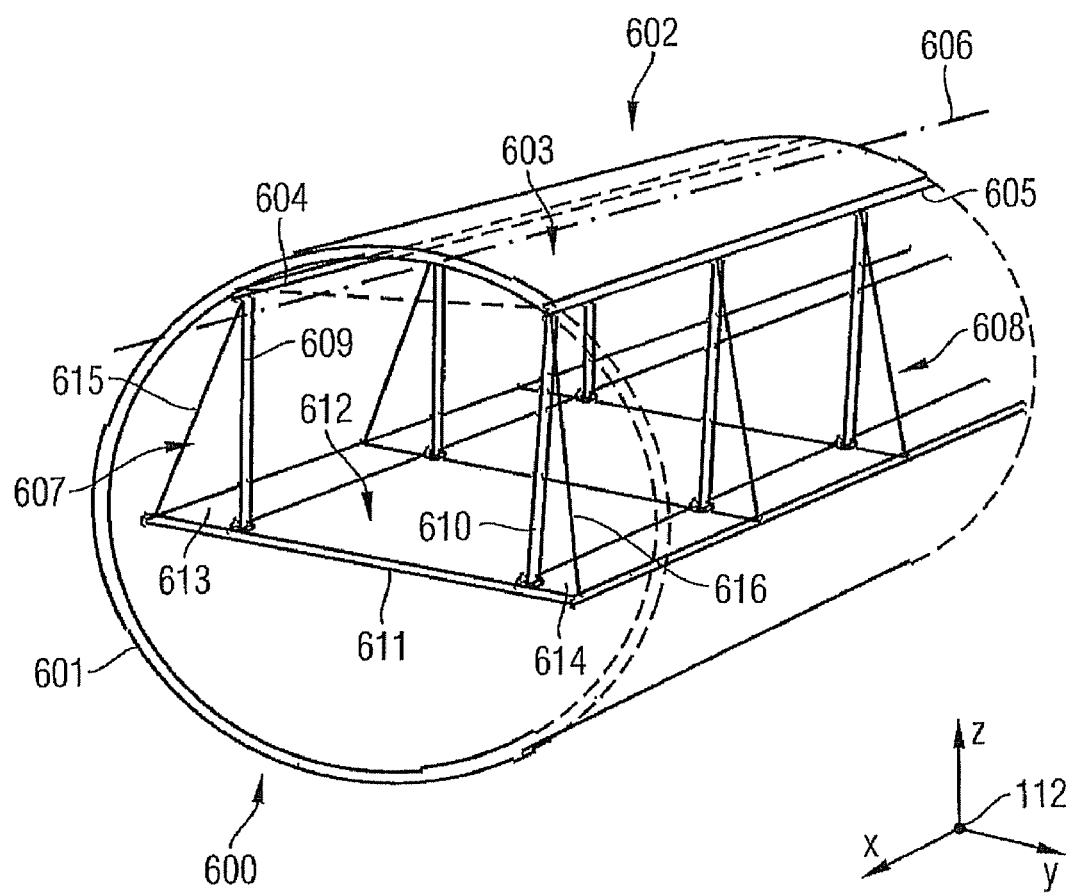
FIG. 12 shows a "reverse" arrangement, i.e. a suspended variant of the floor system.

FIG. 12 shows a "reverse" variant of the floor system.

Here again, a floor system 602 is integrated into a fuselage airframe 600 with a fuselage cell skin 601. In contrast to all the variants of the floor system described above, in an upper region 603 two longitudinal supports 604, 605 are attached running parallel to the x-axis of the coordinate system. The two longitudinal supports 604, 605 run in each case uniformly spaced from a crown line 606 in the upper region 603 of the fuselage airframe 600. The crown line 606 runs through the highest point (apex) of the cross-sectional geometry of the fuselage airframe 600. Attached to (suspended from) the two longitudinal supports 604, 605 in the illustrated embodiment of FIG. 12 are again two support members 607, 608 which, by way of example, are formed from a total of six vertical struts, of which only the two front vertical struts 609, 610 have been provided with a reference numeral. Attached to the vertical struts 609, 610 are a plurality of floor members to provide a continuous and walkable floor surface 612, of which only the foremost floor member 611 has been provided with a reference numeral. Subject to a suitable static inherent stability and loadability, the floor members 611 can at the same time take over the function of the otherwise present crossbars and can be directly connected to the vertical struts. Alternatively, in each case two opposing vertical struts can be connected by a respective crossbar. Longitudinal profiled parts, for example seat rail profiled parts or the like, which run parallel to the x-axis can then optionally be attached to the crossbars and the floor members are then arranged and attached between or on said longitudinal profiled parts to provide the floor surface 612. The floor members 611 or the crossbars preferably have in each case a projecting end 613, 614 on both sides. To further strengthen the floor system 602 in respect of loads which engage parallel to the y-axis, a bracing is preferably also effected by diagonal struts which run from the respective projecting ends 613, 614 to the respective connection points (not designated) of the vertical struts 609, 610 in the region of the longitudinal supports 604, 605. In representation of all the other diagonal struts, the front diagonal struts 615 and 616 are provided with a reference numeral. The diagonal struts 615, 616 can be formed by profiled parts which can be loaded in compression and tension and/or by components which can optionally be loaded exclusively with tensile forces, for example ropes or straps. Reference is made to the information provided above regarding the choice of material for the diagonal struts.

The variant according to FIG. 12 has the particular advantage that the support members 607, 608 and the vertical struts 609, 610 forming these in each case are substantially only loaded in tension parallel to the z-axis, thereby providing the potential to save weight compared to other constructive solutions which require assemblies which can be loaded equally in tension and compression. Furthermore, due to the diagonal struts 615, 616, an additional side connection of the support members 607, 608 to the fuselage airframe 600 and to the annular formers integrated therein is usually superfluous. Thus, with this variant of the floor system 602 which is statically uncoupled from the fuselage airframe 600, it is also possible to make necessary modifications to the floor system 602 substantially independently of the static restrictions of the fuselage airframe 600 at low expense.

Figure 13:
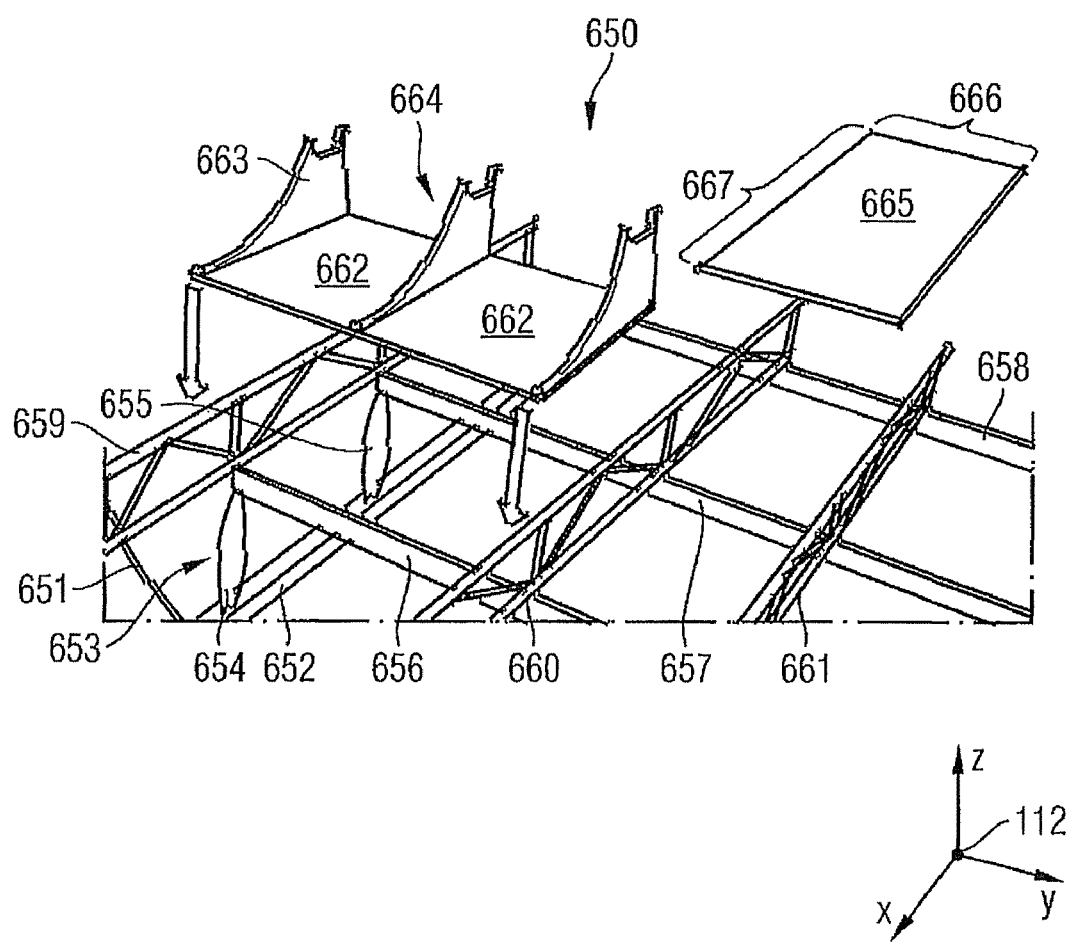
FIG. 13 shows the floor system with two exemplary floor members.

FIG. 13 shows the floor system with two floor members. A floor system 650 in a fuselage airframe 651 comprises, inter alia, two longitudinal supports, only one longitudinal support 652 being visible in the illustration of FIG. 13. Arranged on the longitudinal support 652 is a support member 653 which extends parallel to the x-axis substantially over the entire length of the aircraft. The same applies to the longitudinal support which is not shown. In the illustrated embodiment, the support member 653 comprises vertical struts 654, 655 which can also be configured as (vertically adjustable) Samer rods. A plurality of crossbars 656 to 658 are positioned on the support member 653 and the further support member (not shown), parallel to the y-axis. Positioned on the crossbars 656 to 658 are three longitudinal profiled parts 659 to 661 which, in the illustrated embodiment, are each braced in the manner of a lattice. The longitudinal profiled parts 659 to 661 can be formed, for example, by longitudinal profiled parts having a double-T-shaped cross-sectional geometry (so-called double-T supports), triangular and/or rectangular recesses being milled in a vertical web connecting the two sides of the double-T support to provide the overall lattice-type structure.

A floor member 662 has an adapter 663 which is used to attach a group of three seats (not shown) for passengers (cf. in particular FIG. 8). Both the adapter 663 and the group of seats (not shown) form a functional member 664 which is an integral component of the floor member 662. The adapter 663 allows a straightforward attachment of different assemblies or components, for example groups of seats from different suppliers, on the standardised floor member 662. A further floor member does not have a functional member, but is configured as an equalising floor member 665 which is used in particular for filling (seat spacings) and for equalising empty spaces between floor members with functional members. To achieve this purpose, a width 666 and a length 667 of the equalising floor member 665 are configured in a standardised grid. For example, whole-number multiples of 2.54 cm can be selected for the width 666 (along the y-axis) and for the length (along the x-axis).

The floor member 662 and the equalising floor member 665 are preferably formed using high-strength sandwich boards consisting of fibre-reinforced plastics materials. Subject to an adequate mechanical strength of the floor members 662, 665, it is optionally possible to partly or completely dispense with the longitudinal profiled parts 659 to 661 and/or the crossbars 656 to 658 inside the floor system 650. The floor members 662, 665 are attached to the longitudinal profiled parts 659 to 661 by attachment members (not shown). A surface (not designated) of the floor member 662 or of the equalising floor member 665, but in particular the surfaces of the floor members with functional members arranged thereon, are selected such that each floor member 662, 665 preferably covers at least one grid (not designated) which is defined by at least two crossbars 656, 658 and at least two longitudinal profiled parts 659, 660. Consequently, forces emanating from the functional members of the respective floor members, for example in the form of an arrangement of three passenger seats, are introduced into the floor system 650 over a large area so that the individual components, in particular the crossbars 656 to 658 and the longitudinal profiled parts 659 to 661 can be configured in a statically lighter manner, thus reducing weight, compared to conventional embodiments of floor frames. Furthermore, the floor members with integrated functional members allow a faster and easier assembly because the various functional members are already attached to the floor members and the respective floor portion including, for example, a group of seats is completed by lowering onto the floor member 662 to the longitudinal profiled parts 659, 660 in the direction of the two white arrows and attaching it thereto.

Figure 14:
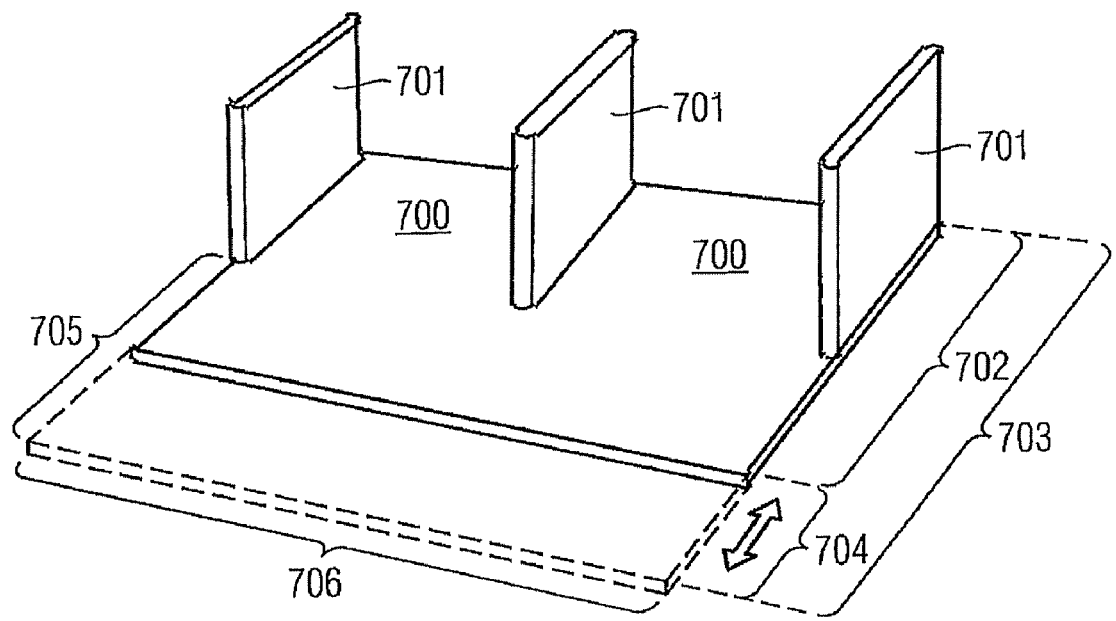
FIG. 14 shows a floor member with an adapter for attaching a functional member, in particular a group of seats.
Figure 14:
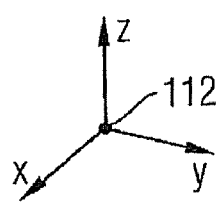

FIG. 14 shows a floor member 700 with an adapter 701 located thereon for attaching further functional members, for example groups of seats (not shown) with in each case two or three seats for passengers.

In order to produce a flexible length equalisation for adjusting specific seat spacings in the direction of the x-axis of the coordinate system 112, the floor member 700 is available in respectively different lengths. In the illustration, the floor member has, for example, alternatively the fixed length 702 or 703. A difference in length 704 (ΔL) between the lengths 702, 703 preferably follows a graduated standard modular dimension, as indicated by the white double arrow, in order to limit a total number of floor members to be stored with respectively different dimensions (length/width). For example, for the difference in length 704 a value can be selected which corresponds to a whole-number multiple of a crossbar spacing of the floor system, which crossbar system, in many cases, will also be identical to a former spacing in the fuselage airframe. For example, if the former spacing in the fuselage airframe is 50 cm, the difference in length 704 can be, for example, a multiple of 50 cm in order to achieve at least a complete peripheral support of the floor members on a grid (not shown) defined by the crossbars and/or the longitudinal profiled parts.

Varying the lengths 702, 703 makes it possible to change a spacing 705 from a previous or subsequent floor member with a group of seats (for example a group of three seats or a group of two seats) mounted thereon as a functional member.

If, in addition, the crossbar spacings (parallel to the y-axis; cf. in this respect in particular FIGS. 9 and 10) and/or the longitudinal profiled part spacings (parallel to the x-axis, cf. in this respect in particular FIG. 7) are varied independently of an existing annular former spacing dimension of the fuselage airframe, the gradation of the difference in length 704 and at the same time a variation of a width 706 of the floor member 700 can be performed in almost any small steps, for example in steps of 10 cm, to achieve a maximum flexibility.

As a result of the tandem arrangement of a plurality of floor members with respectively different fixed lengths 702, 703 graduated in this manner and/or a different width 706 on the support members and the crossbars and/or the longitudinal profiled parts of the floor system, it is possible to adapt a seating arrangement in a passenger aircraft at least in the direction of the x-axis in a simple, rapid and flexible manner to a wide range of customer-specific special requests (for example seat spacings in the direction of flight).

By varying the width 706 of the floor member 700 in likewise preferably standardised gradations, it is also possible to flexibly adapt in particular an aisle width in the direction of the y-axis (cf. in particular FIG. 7) between rows of seating groups within the seating arrangement.

Figure 15:
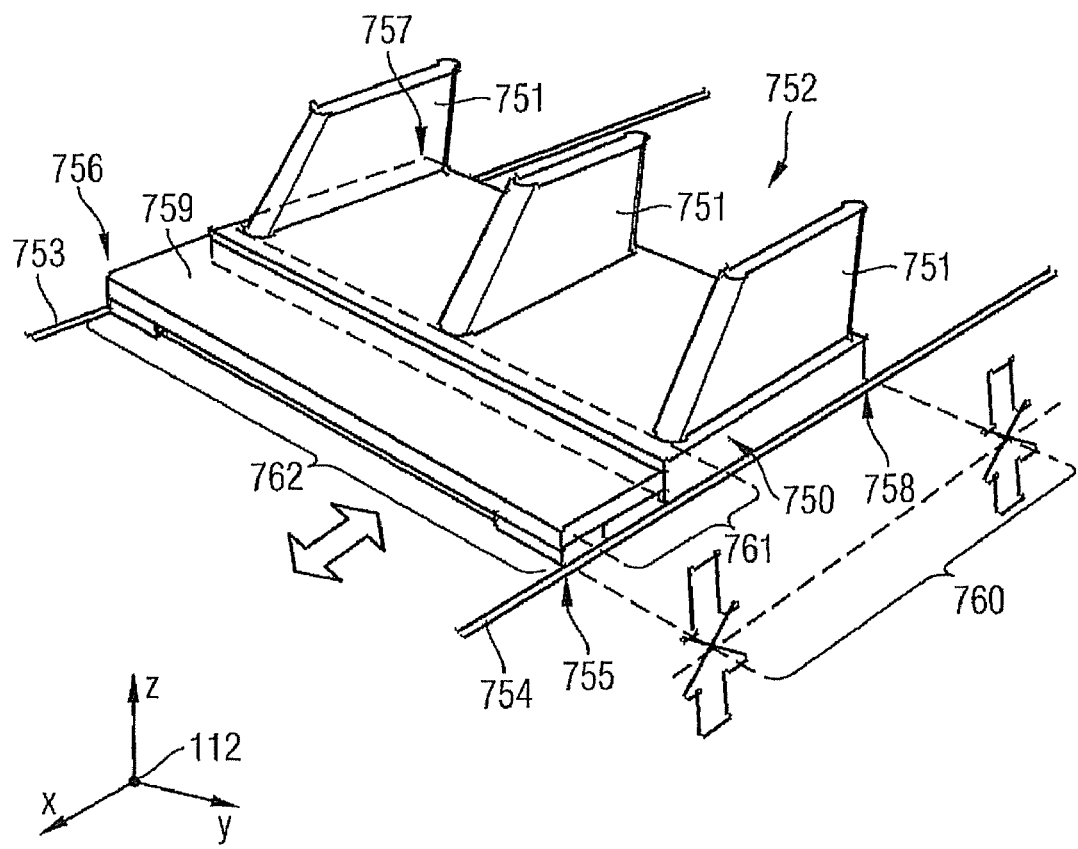
FIG. 15 shows a variant of a floor member which is progressively adjustable (in the direction of the x-axis)

FIG. 15 schematically shows a further alternative variant of a floor member to be used with the floor system.

A floor member 750 is fitted with an adapter 751 in the form of three undesignated platforms as a first functional member 752 which serves as a universal interface to a group of three seats (not shown) for passengers. The floor member 750 is attached to the two longitudinal profiled parts 753, 754 at four attachment points 755 to 758 by suitable attachment members (not shown), as basically indicated by the four opposing arrows. The floor member 750 also has an equalising portion 759 which can be moved inwards and outwards like a drawer along the x-axis of the coordinate system 112 (parallel to the y-axis), as a result of which a length 760 of the floor member 750 can be varied within wide limits. Due to the equalising portion 759 which can be moved inwards and outwards preferably continuously or in stages and can be locked, a length 760 of the floor member 750 can be widely adapted. As a result, it is possible, for example for the first time to flexibly adapt a schematically indicated (seat) spacing 761 of the floor system to different customer requests. The floor member 750 according to FIG. 15 at the same time takes over the function of a floor member with an integrated functional member 752 and that of a universal equalising floor member for a universal equalisation of length along the x-axis of the coordinate system 112.

Due to the fact that the floor member 750 has a large support surface on the longitudinal profiled parts 753, 754, which is defined by the currently adjusted length 760 and a generally fixed width 762, the forces emanating from the adapter 751 and from the functional member 752 arranged thereon are introduced into the floor system, being distributed over a large surface, such that the individual components of the floor system, in particular the longitudinal profiled parts and/or the crossbars, can be configured in a statically lighter manner. Alternatively, the width 762 of the floor member 750 can also be provided with an equalising mechanism which corresponds in construction to the equalising portion 759, in order to be able to vary the width 762 along the y-axis.

Figure 16:
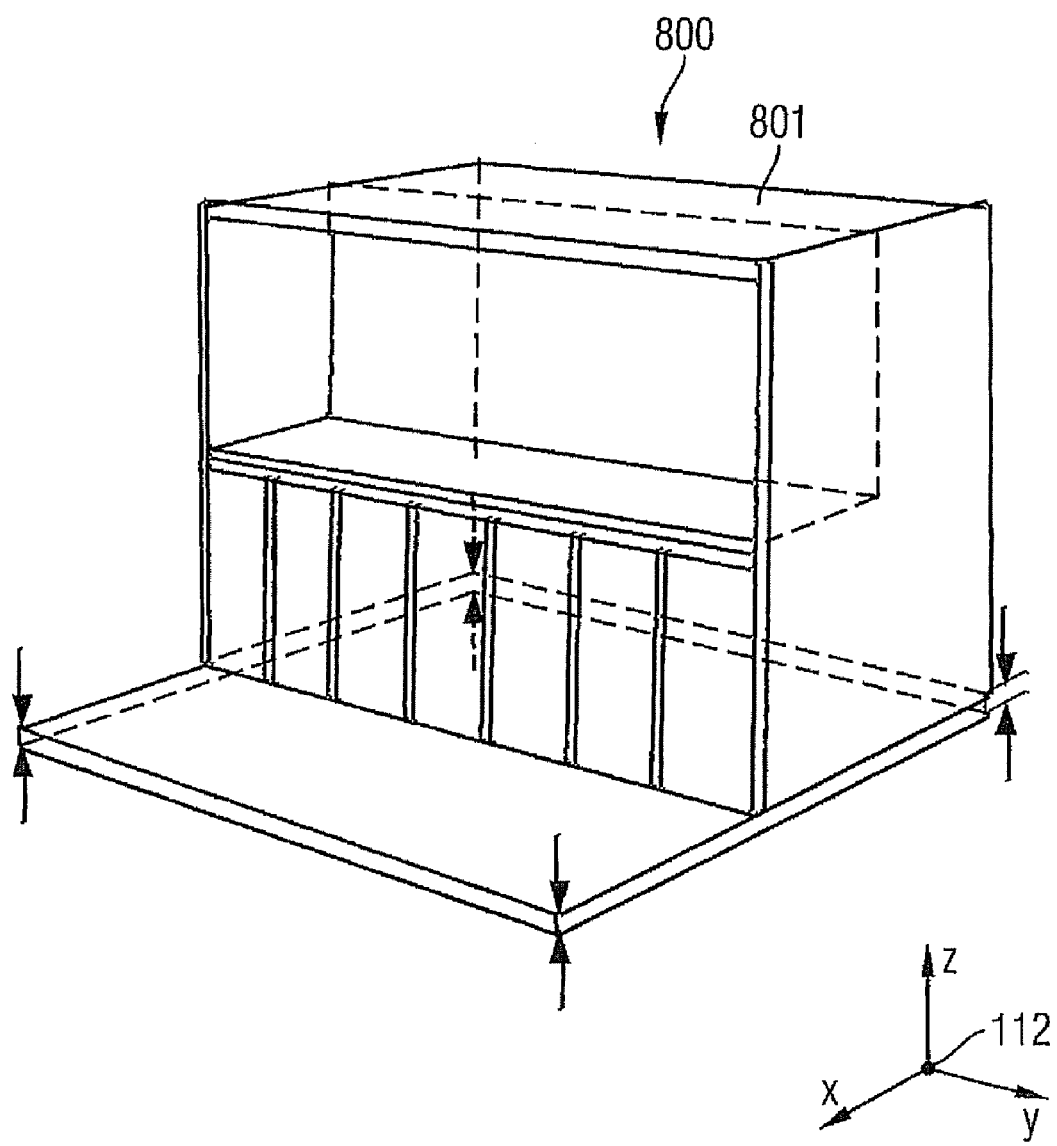
FIG. 16 shows a floor member with a galley as a functional member.

FIG. 16 shows a further variant of a floor member with an integrated functional member.

A floor member 800 is equipped by way of example with a complete kitchen module 801 (so-called "galley") as an optional functional member. The floor member 800 is preferably attached to the longitudinal profiled parts or the crossbars of the floor system in the corner regions, indicated by opposing arrows, of the floor member 800. Instead of the galley 801, the floor member 800 can alternatively be equipped with any other functional members, for example with a complete sanitary module, a storage module, a locker module, a module with at least one sleeping compartment and/or recreation room for passengers and/or staff as well as a housing module for technical devices or any combination thereof.

All the connections for linking the functional member to the necessary on-board systems of the aircraft are preferably integrated into the floor member 800 in the form of a universal interface, so that a rapid and preferably insertable and re-detachable connection of the functional member is possible.

The on-board systems are, for example, electrical systems, optical systems, hydraulic systems, pneumatic systems, fresh water systems, waste water systems or air-conditioning systems of the aircraft.

Figure 17:
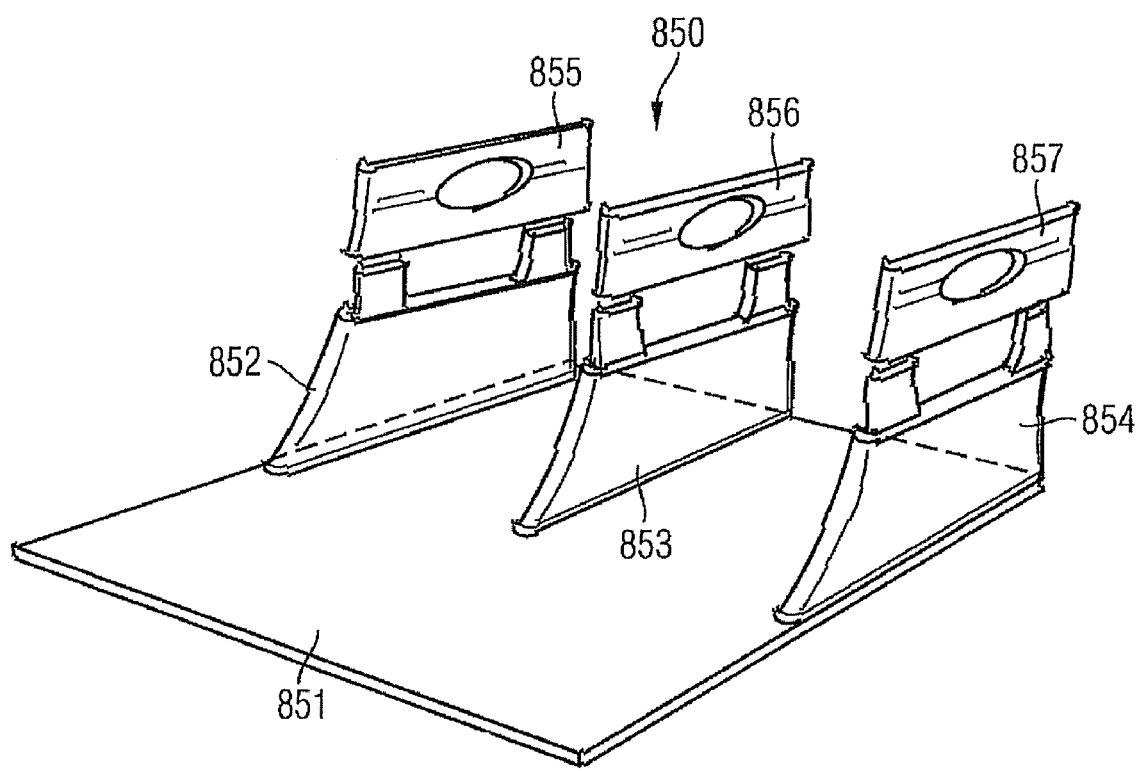
FIG. 17 shows a floor member with an elevation (platform) for attaching a group of seats by means of an adapter.
Figure 18:
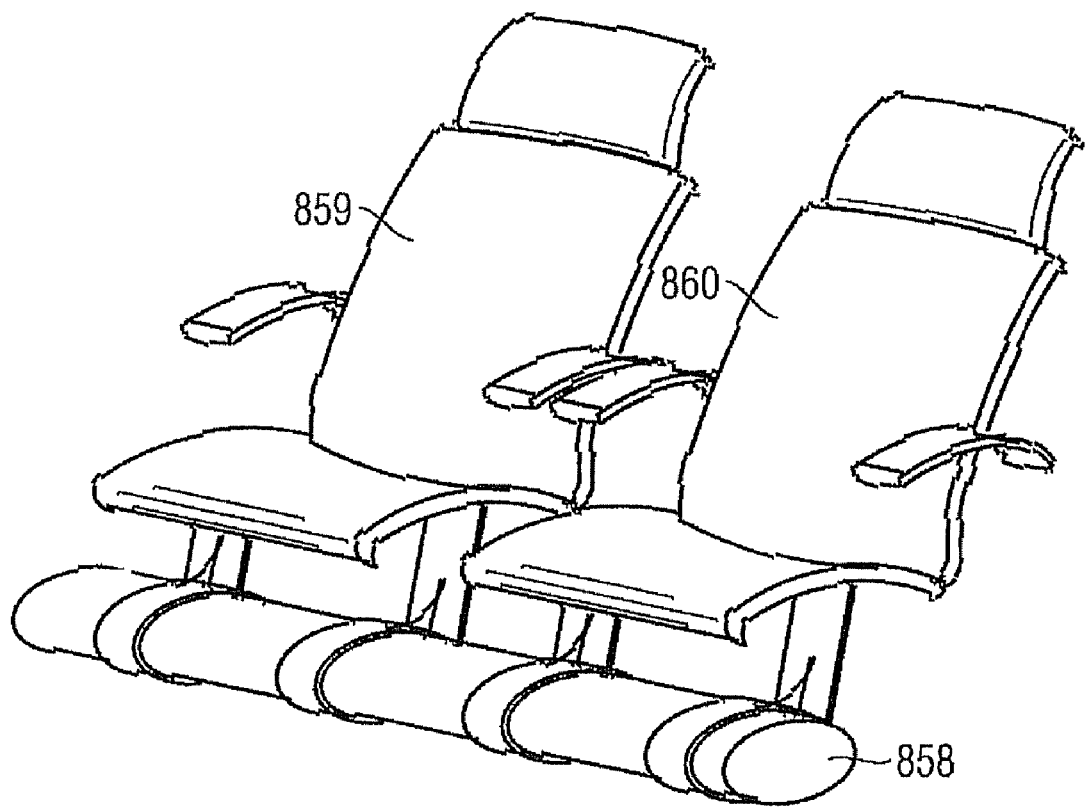
FIG. 18 shows a group of two seats to be attached to the floor member according to FIG. 17.

FIGS. 17 and 18, to which reference will be jointly made, show a further variant of a floor member. A floor member 850 comprises a planar floor plate 851, an elevation (platform) being formed with three supports 852 to 854 which are arranged next to one another and evenly spaced on the floor plate 851. Three adapters 855 to 857 can be attached to the supports 852 to 854, for example by an insertion connection or mortise joint, a screw connection, a plug-in connection or the like. The adapters 855 to 857 are each divided into two with in each case an upper part and a lower part (not provided with a reference numeral). Provided in the upper and lower parts is a respective recess (not designated) which, when the upper and lower parts are assembled, respectively complement each other approximately to form a cross-sectional geometry which corresponds to that of a seat support 858 (cf. FIG. 18), a light press locking preferably occurring between the crossbar and the upper and lower parts of the adapters when assembled in order to ensure a secure fit. In the illustrated embodiment, the seat support 858 has an elliptical cross-sectional geometry. In principle, the seat support 858 can have any other suitable cross-sectional geometry (for example rectangular, square, triangular, oval or the like) which makes it difficult for the seat support 858 to twist around its longitudinal axis in the adapters 855 to 857, or which prevents this from happening. Mounted on the seat support 858 in the illustrated embodiment of FIG. 18 are two (single) seats 859 and 860 with arm rests and head supports, which form a group of seats. When assembled, the floor member 850 comprises the floor plate 851, the three supports 852 to 854, the adapters 855 to 857, the seat support 858 as well as the group of seats located thereon with the two seats 859, 860. Thus, the floor member 850 can be easily integrated into the modular and flexible floor system according to the invention.

The seats 859, 860 attached to the seat supports 858 can be obtained from external suppliers as a result of using the three adapters 855 to 857, while the floor member 850 which is independent of this system is produced by the aircraft manufacturer itself in a standardised state. Thus, a large number of different seat supports 858 with seats 859, 860 can be arranged on and attached to always the same standardised floor member 850, thereby significantly increasing the production efficiency. Furthermore, the adapters 855 to 857 make it easier to remove the passenger seats for rearrangement purposes and/or for cleaning or maintenance operations.

LIST OF REFERENCE NUMERALS 100 fuselage airframe (aircraft)
101 fuselage cell skin
102 annular former
103 floor system (prior art)
104 crossbar
105 Samer rod
106 Samer rod
107 seat rail profiled part
108 floor plate
109 floor
110 passenger compartment (passenger cabin)
111 hold
112 coordinate system
150 seat (passenger seat)
151 leg
152 leg
153 attachment point (seat)
154 attachment point (seat)
155 seat rail profiled part
156 spacing (parallel to the x-axis)
200 fuselage airframe
201 fuselage cell skin
202 floor system
203 lower region (fuselage airframe)
204 longitudinal support
205 longitudinal support
206 support member
207 support member
208 vertical strut
209 vertical strut
210 diagonal strut
211 longitudinal strut
212 crossbar
213 side connection (Samer rod)
214 Samer rod
215 Samer rod
216 crossbar
250 fuselage airframe
251 fuselage cell skin
252 floor system
253 lower region
254 longitudinal support
255 longitudinal support
256 support member
257 support member
258 vertical strut
259 crossbar
260 seat rail profiled part
261 floor surface
262 floor member
263 side connection
264 side connection
300 fuselage airframe
301 fuselage cell skin
302 floor system
303 lower region
304 longitudinal support
305 longitudinal support
306 support member
307 support member
308 crossbar
309 floor member
310 floor member
311 floor member
312 step
313 step
350 fuselage airframe
351 fuselage cell skin
352 floor system
353 lower region
354 longitudinal support
355 longitudinal support
356 support member
357 support member
358 support member
359 support member
360 floor member
361 floor member
362 floor surface
363 arrow
364 arrow
365 height
366 height
367 rear hold
368 front hold
369 passenger cabin
400 fuselage airframe
401 fuselage cell skin
402 floor system
403 lower region
404 longitudinal support
405 longitudinal support
406 support member
407 support member
408 vertical strut
409 vertical strut
410 diagonal strut
411 diagonal strut
412 crossbar
413 seat rail profiled part
414 attachment means
415 functional member
416 functional member
417 group of seats (group of three seats)
418 group of seats (group of three seats)
419 adapter
420 adapter
421 aisle width
450 fuselage airframe
451 fuselage cell skin
452 floor system
453 lower region 454 longitudinal support
455 longitudinal support
456 support member
457 support member
458 upper longitudinal support
459 upper longitudinal support
460 crossbar
461 arrow
462 recess
463 recess
464 floor member
500 fuselage airframe
501 fuselage cell skin
502 floor system
503 lower region
504 longitudinal support
505 longitudinal support
506 support member
507 support member
508 support member
509 support member
510 crossbar
511 crossbar
512 strap
513 strap
514 strap
515 strap
516 guide means
517 guide means
518 arrow
550 fuselage airframe
551 fuselage cell skin
552 floor system
553 lower region
554 longitudinal support
555 longitudinal support
556 support member
557 support member
558 base line (fuselage airframe)
559 crossbar
560 projecting end (overhanging end)
561 projecting end (overhanging end)
562 triangular strut
563 triangular strut
600 fuselage airframe
601 fuselage cell skin
602 floor system
603 upper region
604 longitudinal support
605 longitudinal support
606 crown line
607 support member
608 support member
609 vertical strut
610 vertical strut
611 floor member
612 floor surface
613 projecting end (floor member/crossbar)
614 projecting end (floor member/crossbar)
615 diagonal strut
616 diagonal strut
650 floor system
651 fuselage airframe
652 longitudinal support
653 support member
654 vertical strut
655 vertical strut
656 crossbar
657 crossbar
658 crossbar
659 longitudinal profiled part
660 longitudinal profiled part
661 longitudinal profiled part
662 floor member
663 adapter (for example for group of seats)
664 functional member
665 equalising floor member
666 width (equalising floor member)
667 length (equalising floor member)
700 floor member
701 adapter (for example for a group of seats)
702 length (first floor member)
703 length (second floor member)
704 difference in length
705 spacing (seat spacing)
706 width
750 floor member
751 adapter
752 functional member
753 longitudinal profiled part
754 longitudinal profiled part
755 attachment point
756 attachment point
757 attachment point
758 attachment point
759 equalising portion (telescopic)
760 length (floor member)
761 spacing (seat spacing)
762 width (floor member)
800 floor member
801 functional member (galley)
850 floor member
851 floor plate
852 support
853 support
854 support
855 adapter
856 adapter
857 adapter
858 seat support
859 seat
860 seat

The invention claimed is:

1. A floor system for a fuselage airframe of an aircraft with a plurality of floor members to form a floor surface, comprising at least two longitudinal supports, which are directly attached to the fuselage airframe in a lower region or in an upper region of the fuselage airframe and on which in each case at least one support member is arranged, wherein the support members can be moved and locked on the longitudinal supports parallel to an x-axis of the aircraft, and in each case at least one crossbar is arranged on the at least two opposing support members for supporting and attaching the floor members, as a result of which the floor system is configured to be substantially self-supporting and mechanically substantially uncoupled from the fuselage airframe as a primary structure.

2. The floor system according to claim 1, wherein at least one support member is configured as a lattice-type bracing.

3. The floor system according to claim 1, wherein the support members have different fixed heights in relation to a z-axis.

4. The floor system according claim 1, wherein at least two longitudinal profiled parts, in particular at least two seat rail profiled parts can be moved and locked on at least two crossbars parallel to the y-axis in order to attach thereto at least one functional member, in particular in each case at least one group of seats having at least two seats.

5. The floor system according to claim 1, wherein at least one support member is connected at least in portions to the fuselage airframe by at least a side connection, in particular a framework, dampers, ropes or straps.

6. The floor system according to claim 1, wherein at least two opposing support members are braced in respect of forces which act parallel to the y-axis, in particular by means of bilaterally arranged triangular struts in the region of projecting ends of a crossbar resting on the two support members.

7. The floor system according to claim 1, wherein at least two longitudinal supports are attached in the upper region of the fuselage airframe and in each case at least one support member, in particular at least one lattice-type bracing, is suspended from a respective longitudinal support and in each case at least one crossbar is arranged on the at least two support members to attach floor members.

8. A floor member for a floor system in a fuselage airframe of an aircraft according to claim 1, characterized in that the at least one floor member has at least one functional member, in particular a seat, a group of seats, a galley and/or a sanitary module in order to achieve the introduction of force over a large area into the floor system.

9. The floor member according to claim 8, wherein a spacing between two functional members arranged in series in relation to an x-axis can be varied continuously.

10. The floor member according to claim 8, wherein a spacing between two functional members arranged in series in relation to an x-axis can be varied in stages.

11. A floor system for a fuselage airframe of an aircraft with a plurality of floor members to form a floor surface, comprising at least two longitudinal supports, which are directly attached to the fuselage airframe in a lower region or in an upper region of the fuselage airframe and on which in each case at least one support member is arranged, wherein the support members can be vertically adjusted parallel to a z-axis and in each case at least one crossbar is arranged on the at least two opposing support members for supporting and attaching the floor members, and in each case at least one crossbar is arranged on the at least two opposing support members for supporting and attaching the floor members, as a result of which the floor system is configured to be substantially self-supporting and mechanically substantially uncoupled from the fuselage airframe as a primary structure.

12. A floor system for a fuselage airframe of an aircraft with a plurality of floor members to form a floor surface, comprising at least two longitudinal supports, which are directly attached to the fuselage airframe in a lower region or in an upper region of the fuselage airframe and on which in each case at least one support member is arranged, and in each case at least one crossbar is arranged on the at least two opposing support members for supporting and attaching the floor members, wherein at least one crossbar can be moved and locked on at least two support members parallel to an x-axis, and in each case at least one crossbar is arranged on the at least two opposing support members for supporting and attaching the floor members, as a result of which the floor system is configured to be substantially self-supporting and mechanically substantially uncoupled from the fuselage airframe as a primary structure.

* * * * *